United States Patent
Ezell et al.

(10) Patent No.: US 9,912,705 B2
(45) Date of Patent: Mar. 6, 2018

(54) ENHANCING MEDIA CHARACTERISTICS DURING WEB REAL-TIME COMMUNICATIONS (WEBRTC) INTERACTIVE SESSIONS BY USING SESSION INITIATION PROTOCOL (SIP) ENDPOINTS, AND RELATED METHODS, SYSTEMS, AND COMPUTER-READABLE MEDIA

(71) Applicant: Avaya Inc., Basking Ridge, NJ (US)

(72) Inventors: Joel Ezell, Broomfield, CO (US); Mehmet Balasaygun, Freehold, NJ (US); John H. Yoakum, Cary, NC (US)

(73) Assignee: Avaya Inc., Basking Ridge, NJ (US)

( * ) Notice: Subject to any disclaimer, the term of this patent is extended or adjusted under 35 U.S.C. 154(b) by 617 days.

(21) Appl. No.: 14/313,041

(22) Filed: Jun. 24, 2014

(65) Prior Publication Data

US 2015/0373057 A1    Dec. 24, 2015

(51) Int. Cl.
*H04L 29/06*    (2006.01)
*H04L 29/08*    (2006.01)

(52) U.S. Cl.
CPC ........ *H04L 65/1006* (2013.01); *H04L 65/103* (2013.01); *H04L 65/1069* (2013.01);
(Continued)

(58) Field of Classification Search
CPC ... H04L 29/06; H04L 65/1006; H04L 65/403; H04L 65/601; H04L 65/1069; H04L 65/1066; H04L 67/02
(Continued)

(56) References Cited

U.S. PATENT DOCUMENTS 6,714,967 B1    3/2004 Horvitz
7,107,316 B2    9/2006 Brown et al.
(Continued)

FOREIGN PATENT DOCUMENTS

CN    1732665    2/2006
CN    103580986    2/2014
(Continued)

OTHER PUBLICATIONS

Rodriguez, Pedro et al., "Advanced Videoconferencing Services Based on WebRTC," IADIS International Conferences Web Based Communities and Social Media 2012 and Collaborative Technologies 2012, Jul. 17-23, 2012, pp. 180-184, http://www.iadisportal.org/wbc-2012-proceedings.

(Continued)

*Primary Examiner* — Kevin Bates
*Assistant Examiner* — Mark A Scott
(74) *Attorney, Agent, or Firm* — Sheridan Ross P.C.

(57) ABSTRACT

Enhancing media characteristics during Web Real-Time Communications (WebRTC) interactive sessions by using Session Initiation Protocol (SIP) endpoints, and related methods, systems, and computer-readable media are disclosed herein. In one embodiment, a method comprises intercepting, by a media redirection agent of a WebRTC client executing on a computing device, a WebRTC initiation token. The method further comprises generating a SIP endpoint WebRTC token based on the WebRTC initiation token, and sending the SIP endpoint WebRTC token to a remote endpoint. The method also comprises establishing a WebRTC interactive session between the remote endpoint and a SIP endpoint based on the SIP endpoint WebRTC token. By leveraging the audio and/or video functionality of the SIP endpoint, the media characteristics of the WebRTC (Continued)

interactive session may be enhanced, resulting in an enhanced user experience.

20 Claims, 18 Drawing Sheets

(52) U.S. Cl.
CPC ............ *H04L 65/608* (2013.01); *H04L 65/80* (2013.01); *H04L 67/02* (2013.01)

(58) Field of Classification Search
USPC ........................................................ 709/204
See application file for complete search history.

(56) References Cited

U.S. PATENT DOCUMENTS

| | | |
|---|---|---|
| 7,145,898 B1 | 12/2006 | Elliott |
| 7,266,591 B1 | 9/2007 | Johnston |
| 7,379,993 B2 | 5/2008 | Valdes et al. |
| 7,636,348 B2 | 12/2009 | Bettis et al. |
| 7,730,309 B2 | 6/2010 | Zimmermann |
| 8,015,484 B2 | 9/2011 | Backer |
| 8,250,635 B2 | 8/2012 | Chari et al. |
| 8,300,632 B2 | 10/2012 | Davis et al. |
| 8,467,308 B2 | 6/2013 | Johnston |
| 8,494,507 B1 | 7/2013 | Tedesco et al. |
| 8,601,144 B1 | 12/2013 | Ryner |
| 8,605,711 B1 | 12/2013 | Sinnreich et al. |
| 8,606,950 B2 | 12/2013 | Glatron et al. |
| 8,693,392 B2 | 4/2014 | Cooper et al. |
| 8,695,077 B1 | 4/2014 | Gerhard et al. |
| 8,737,596 B2 | 5/2014 | Kelley et al. |
| 8,744,147 B2 | 6/2014 | Torti |
| 8,832,271 B2 | 9/2014 | McCarty |
| 8,856,236 B2 | 10/2014 | Moore et al. |
| 8,861,692 B1 | 10/2014 | Phelps et al. |
| 8,867,731 B2 | 10/2014 | Lum et al. |
| 2002/0161685 A1 | 10/2002 | Dwinnell |
| 2003/0112766 A1 | 6/2003 | Riedel et al. |
| 2003/0120599 A1 | 6/2003 | Agboatwalla et al. |
| 2003/0131245 A1 | 7/2003 | Linderman |
| 2003/0188193 A1 | 10/2003 | Venkataramappa |
| 2004/0019494 A1 | 1/2004 | Ridgeway et al. |
| 2004/0081173 A1 | 4/2004 | Feather |
| 2004/0093515 A1 | 5/2004 | Reeves, Jr. |
| 2004/0167984 A1 | 8/2004 | Herrmann |
| 2004/0216173 A1 | 10/2004 | Horoszowski et al. |
| 2005/0084082 A1 | 4/2005 | Horvitz et al. |
| 2005/0177380 A1 | 8/2005 | Pritchard et al. |
| 2006/0104526 A1 | 5/2006 | Gringeler et al. |
| 2006/0155814 A1 | 7/2006 | Bennett et al. |
| 2006/0159063 A1 | 7/2006 | Kumar |
| 2006/0200855 A1 | 9/2006 | Willis |
| 2006/0230438 A1 | 10/2006 | Shappir et al. |
| 2007/0083929 A1 | 4/2007 | Sprosts et al. |
| 2007/0143408 A1 | 6/2007 | Daigle |
| 2007/0255662 A1 | 11/2007 | Tumminaro |
| 2007/0283423 A1 | 12/2007 | Bradley et al. |
| 2008/0046414 A1 | 2/2008 | Haub et al. |
| 2008/0046457 A1 | 2/2008 | Haub et al. |
| 2008/0046838 A1 | 2/2008 | Haub et al. |
| 2008/0127137 A1 | 5/2008 | Becker et al. |
| 2008/0162642 A1 | 7/2008 | Bachiri et al. |
| 2008/0192646 A1 | 8/2008 | Song et al. |
| 2008/0270541 A1 | 10/2008 | Keener et al. |
| 2009/0070477 A1 | 3/2009 | Baum et al. |
| 2009/0094684 A1 | 4/2009 | Chinnusamy et al. |
| 2009/0219920 A1* | 9/2009 | Brandstatter ....... H04L 65/1069 370/352 |
| 2009/0300060 A1 | 12/2009 | Beringer et al. |
| 2010/0011282 A1 | 1/2010 | Dollard et al. |
| 2010/0023519 A1 | 1/2010 | Kailash et al. |
| 2010/0024019 A1 | 1/2010 | Backlund |
| 2010/0037324 A1 | 2/2010 | Grant et al. |
| 2010/0118700 A1 | 5/2010 | Blum et al. |
| 2010/0246571 A1 | 9/2010 | Geppert et al. |
| 2011/0102930 A1 | 5/2011 | Johnston et al. |
| 2011/0206013 A1 | 8/2011 | Aramoto et al. |
| 2011/0238862 A1 | 9/2011 | Chaturvedi et al. |
| 2012/0001932 A1 | 1/2012 | Burnett et al. |
| 2012/0079031 A1 | 3/2012 | Matthews et al. |
| 2012/0137231 A1 | 5/2012 | Maxfield et al. |
| 2012/0158862 A1 | 6/2012 | Mosko et al. |
| 2012/0192086 A1 | 7/2012 | Ghods et al. |
| 2012/0221725 A1* | 8/2012 | Schroeder, Jr. ......... G06F 9/468 709/225 |
| 2013/0002799 A1 | 1/2013 | Mock |
| 2013/0078972 A1 | 3/2013 | Levien et al. |
| 2013/0091286 A1 | 4/2013 | Spencer |
| 2013/0138829 A1 | 5/2013 | Bulava |
| 2013/0321340 A1 | 12/2013 | Seo et al. |
| 2013/0325934 A1 | 12/2013 | Fausak et al. |
| 2013/0346329 A1 | 12/2013 | Alib-Bulatao et al. |
| 2014/0013202 A1 | 1/2014 | Schlumberger |
| 2014/0043994 A1 | 2/2014 | Bansal et al. |
| 2014/0095633 A1 | 4/2014 | Yoakum |
| 2014/0095724 A1 | 4/2014 | Yoakum et al. |
| 2014/0095731 A1 | 4/2014 | Carey et al. |
| 2014/0108594 A1 | 4/2014 | Siegel et al. |
| 2014/0126708 A1 | 5/2014 | Sayko |
| 2014/0126714 A1 | 5/2014 | Sayko |
| 2014/0126715 A1* | 5/2014 | Lum ................... H04M 3/5133 379/265.09 |
| 2014/0143823 A1 | 5/2014 | Manchester et al. |
| 2014/0149512 A1 | 5/2014 | Leitch |
| 2014/0161237 A1 | 6/2014 | Tolksdorf |
| 2014/0201820 A1 | 7/2014 | Li et al. |
| 2014/0219167 A1 | 8/2014 | Santhanam et al. |
| 2014/0222893 A1* | 8/2014 | Gangadharan ...... H04L 65/1016 709/203 |
| 2014/0222894 A1* | 8/2014 | Gangadharan .......... H04L 67/02 709/203 |
| 2014/0222930 A1* | 8/2014 | Gangadharan .......... H04L 51/04 709/206 |
| 2014/0223452 A1* | 8/2014 | Santhanam ............. G06F 9/541 719/328 |
| 2014/0237057 A1 | 8/2014 | Khodorenko |
| 2014/0241215 A1* | 8/2014 | Massover ........... H04L 12/1818 370/260 |
| 2014/0244235 A1 | 8/2014 | Michaelis |
| 2014/0245143 A1 | 8/2014 | Saint-Marc |
| 2014/0258822 A1 | 9/2014 | Li et al. |
| 2014/0259127 A1* | 9/2014 | Shaw .................. H04L 63/0884 726/5 |
| 2014/0269326 A1 | 9/2014 | Westin et al. |
| 2014/0270104 A1 | 9/2014 | O'Connor |
| 2014/0280734 A1 | 9/2014 | Chaturvedi et al. |
| 2014/0282054 A1 | 9/2014 | Yoakum |
| 2014/0282135 A1 | 9/2014 | Segre |
| 2014/0282399 A1 | 9/2014 | Gorelik et al. |
| 2014/0282765 A1 | 9/2014 | Casey et al. |
| 2014/0282903 A1 | 9/2014 | Singh et al. |
| 2014/0324979 A1* | 10/2014 | Gao ....................... G06F 17/00 709/204 |
| 2014/0325078 A1* | 10/2014 | Shan ................. H04W 36/0066 709/227 |
| 2014/0344169 A1* | 11/2014 | Phelps ................. G06Q 30/016 705/304 |
| 2014/0348044 A1* | 11/2014 | Narayanan .......... H04L 65/1016 370/310 |
| 2014/0365676 A1 | 12/2014 | Yoakum |
| 2014/0379931 A1 | 12/2014 | Gaviria |
| 2015/0002614 A1* | 1/2015 | Zino ..................... H04N 7/148 348/14.08 |
| 2015/0002619 A1 | 1/2015 | Johnston et al. |
| 2015/0006610 A1 | 1/2015 | Johnston et al. |
| 2015/0006611 A1 | 1/2015 | Johnston et al. |
| 2015/0026473 A1 | 1/2015 | Johnston et al. |
| 2015/0033300 A1* | 1/2015 | Timariu ................ H04L 63/168 726/5 |
| 2015/0036690 A1 | 2/2015 | Pastro |
| 2015/0039687 A1 | 2/2015 | Waxman et al. |

(56) References Cited

U.S. PATENT DOCUMENTS

| | | | |
|---|---|---|---|
| 2015/0039760 A1 | 2/2015 | Yoakum | |
| 2015/0052067 A1 | 2/2015 | Thiyagarajan et al. | |
| 2015/0082021 A1* | 3/2015 | Mandyam | G06F 9/541 713/151 |
| 2015/0106438 A1* | 4/2015 | Fan | H04L 12/1818 709/203 |
| 2015/0106528 A1* | 4/2015 | Somes | H04L 67/141 709/228 |
| 2015/0180748 A1* | 6/2015 | Ding | H04L 41/046 709/224 |
| 2015/0180825 A1* | 6/2015 | Ren | H04L 61/2564 709/228 |
| 2015/0195309 A1* | 7/2015 | Opsenica | H04L 65/1006 709/228 |
| 2015/0229635 A1* | 8/2015 | Saridaki | H04L 65/1006 726/8 |
| 2015/0264106 A1* | 9/2015 | Baek | H04W 48/18 709/203 |
| 2015/0280963 A1* | 10/2015 | Bollapalli | H04L 41/0206 709/227 |
| 2015/0281234 A1* | 10/2015 | Sylvain | G06F 21/31 726/1 |
| 2015/0334136 A1* | 11/2015 | Gao | H04M 7/006 709/228 |
| 2015/0365244 A1* | 12/2015 | Schmitz | H04L 65/605 715/753 |
| 2015/0373056 A1* | 12/2015 | Bouthemy | H04L 65/1006 709/203 |
| 2016/0065623 A1* | 3/2016 | Whynot | H04L 65/1006 709/227 |
| 2016/0191523 A1* | 6/2016 | Jian | H04L 67/02 726/4 |
| 2016/0315938 A1* | 10/2016 | Kunz | H04L 65/1016 |
| 2016/0323325 A1* | 11/2016 | Nie | H04L 65/1016 |
| 2016/0359927 A1* | 12/2016 | Li | H04L 29/06 |
| 2017/0104704 A1* | 4/2017 | Choi | H04L 51/046 |
| 2017/0141934 A1* | 5/2017 | Ding | H04L 12/66 |

FOREIGN PATENT DOCUMENTS

| | | |
|---|---|---|
| EP | 1615386 A1 | 1/2006 |
| EP | 2529316 A2 | 12/2012 |
| GB | 2295747 A | 6/1996 |
| GB | 2468758 A | 9/2010 |
| GB | 2468759 A | 9/2010 |
| GB | 2517833 A | 3/2015 |
| JP | 2002207683 A | 7/2002 |
| JP | 2002374318 A | 12/2002 |
| JP | 2005346556 A | 12/2005 |
| JP | 2006050407 A | 2/2006 |
| JP | 2011504665 A | 2/2011 |
| WO | WO 2004/062229 | 7/2004 |
| WO | 2014060008 A1 | 4/2014 |
| WO | 2014123738 A1 | 8/2014 |
| WO | 2014190094 A1 | 11/2014 |
| WO | 2015032277 A1 | 3/2015 |

OTHER PUBLICATIONS

Examination Report for British Patent Application GB1411584.4, dated Aug. 21, 2015, 1 page.
Examination Report for British Patent Application GB1411580.2, dated Aug. 21, 2015, 1 page.
Notification of Reasons for Refusal for Japanese Patent Application 2013-201221, dated Aug. 25, 2015, 8 pages.
Non-Final Office Action for U.S. Appl. No. 13/835,913, dated Sep. 3, 2015, 19 pages.
Non-Final Office Action for U.S. Appl. No. 13/912,520, dated Sep. 9, 2015, 21 pages.
Non-Final Office Action for U.S. Appl. No. 13/863,662, dated Sep. 25, 2015, 23 pages.
Advisory Action for U.S. Appl. No. 13/803,292, dated Aug. 21, 2015, 3 pages.
Non-Final Office Action for U.S. Appl. No. 13/803,292, dated Oct. 9, 2015, 13 pages.
Advisory Action and Examiner-Initiated Interview Summary for U.S. Appl. No. 14/050,891, dated Sep. 29, 2015, 4 pages.
Final Office Action for U.S. Appl. No. 14/068,839, dated Sep. 9, 2015, 17 pages.
Final Office Action for U.S. Appl. No. 13/931,967, dated Aug. 20, 2015, 12 pages.
Final Office Action for U.S. Appl. No. 13/931,970, dated Aug. 27, 2015, 10 pages.
Bergkvist, Adam et al., "WebRTC 1.0: Real-time Communication Between Browsers," W3C Working Draft, Feb. 9, 2012, http://www.w3.org/TR/2012/WD-webrtc-20120209/, 42 pages.
Notice of Reason for Refusal for Japanese Patent Application 2013-201228, dated Jun. 11, 2015, 8 pages.
Advisory Action for U.S. Appl. No. 13/835,913, dated Jun. 10, 2015, 3 pages.
Final Office Action for U.S. Appl. No. 13/803,292, dated Jun. 12, 2015, 17 pages.
Final Office Action and Examiner Initiated Interview Summary for U.S. Appl. No. 14/050,891, dated Jun. 29, 2015, 11 pages.
Final Office Action for U.S. Appl. No. 13/955,023, dated Jul. 20, 2015, 17 pages.
Corrected Notice of Allowability for U.S. Appl. No. 13/944,368, dated Jul. 23, 2015, 4 pages.
Non-Final Office Action for U.S. Appl. No. 14/141,798, dated Jul. 17, 2015, 13 pages.
Extended European Search Report for European Patent Application 15161452.6, dated Jun. 23, 2015, 5 pages.
Non-Final Office Action for U.S. Appl. No. 13/955,711, dated Nov. 9, 2015, 10 pages.
Notice of Allowance for U.S. Appl. No. 14/050,891, dated Nov. 10, 2015, 10 pages.
Non-Final Office Action for U.S. Appl. No. 13/955,023, dated Dec. 9, 2015, 13 pages.
Non-Final Office Action for U.S. Appl. No. 14/037,440, dated Oct. 22, 2015, 15 pages.
Advisory Action for U.S. Appl. No. 13/931,967, dated Nov. 3, 2015, 3 pages.
Advisory Action for U.S. Appl. No. 13/931,970, dated Nov. 5, 2015, 3 pages.
Non-Final Office Action for U.S. Appl. No. 14/068,943, dated Dec. 2, 2015, 16 pages.
Non-Final Office Action for U.S. Appl. No. 14/255,429, dated Nov. 9, 2015, 26 pages.
Search Report for British Patent Application No. GB1423089.0, dated Jul. 6, 2015, 4 pages.
Author Unknown, "WebRTC," WebRTC.org, Date Accessed: Jan. 26, 2016, 4 pages, http://webrtc.org/.
Notice of Allowance for U.S. Appl. No. 13/863,662, dated Feb. 1, 2016, 17 pages.
Advisory Action and Examiner-Initiated Interview Summary for U.S. Appl. No. 14/068,839, dated Feb. 12, 2016, 4 pages.
Final Office Action for U.S. Appl. No. 14/141,798, dated Dec. 24, 2015, 10 pages.
Non-Final Office Action for U.S. Appl. No. 14/174,371, dated Feb. 18, 2016, 18 pages.
Non-Final Office Action for U.S. Appl. No. 13/931,970, dated Feb. 23, 2016, 11 pages.
Loreto, Salvatore et al., "Real-Time Communications in the Web: Issues, Achievements, and Ongoing Standardization Efforts," IEEE Internet Computing, vol. 16, Issue 5, IEEE Computer Society, Oct. 2, 2012, pp. 68-73.
Search Report for British patent application GB1411584.4 dated Dec. 30, 2014, 4 pages.
Search Report for British patent application GB1411580.2 dated Dec. 30, 2014, 4 pages.
Non-Final Office Action for U.S. Appl. No. 13/931,968, dated Dec. 8, 2014, 6 pages.
Non-Final Office Action for U.S. Appl. No. 13/835,913, dated Nov. 20, 2014, 15 pages.

(56) References Cited

OTHER PUBLICATIONS

Non-Final Office Action for U.S. Appl. No. 13/803,292, dated Jan. 27, 2015, 13 pages.
Non-Final Office Action for U.S. Appl. No. 14/050,891, dated Jan. 29, 2015, 9 pages.
Non-Final Office Action for U.S. Appl. No. 13/955,023, dated Feb. 2, 2015, 12 pages.
Barth, A. "The Web Origin Concept," Internet Engineering Task Force (IETF), Request for Comments 6454 (RFC 6454), Dec. 2011, 19 pages, http://www.ietf.org/rfc/rfc6454.txt.
Fischl, J. et al., "Framework for Establishing a Secure Real-time Transport Protocol (SRTP) Security Context Using Datagram Transport Layer Security (DTLS)," Internet Engineering Task Force (IETF), Request for Comments (RFC) 5763, May 2010, 26 pages.
Jesup, R. et al., "DTLS Encapsulation of SCTP Packets for RTCWEB," IETF: Network Working Group, Internet Draft, Feb. 16, 2013, 6 pages.
Johnston, A. et al., "An Origin Attribute for the STUN Protocol," Internet Engineering Task Force (IETF), Internet-Draft, Jul. 20, 2014, 14 pages, https://tools.ietf.org/html/draft-ietf-tram-stun-origin-00.
Rescorla, E., "Security Considerations for RTC-Web," IETF RTCWEB, Internet Draft, Jan. 22, 2013, 16 pages.
Rescorla, E., "WebRTC Security Architecture," IETF RTCWEB, Internet Draft, Jul. 14, 2013, 30 pages.
Corrected Notice of Allowability for U.S. Appl. No. 13/931,968, dated Apr. 24, 2015, 4 pages.
Advisory Action for U.S. Appl. No. 14/037,440, dated May 20, 2015, 3 pages.
Search Report for British Patent Application GB1419338.7, dated Apr. 27, 2015, 4 pages.
Search Report for British Patent Application GB1419334.6, dated Apr. 28, 2015, 6 pages.
Notice of Allowance for U.S. Appl. No. 13/944,368, dated Apr. 1, 2015, 8 pages.
Non-Final Office Action for U.S. Appl. No. 13/931,967, dated May 5, 2015, 10 pages.
Non-Final Office Action for U.S. Appl. No. 13/931,970, dated May 7, 2015, 9 pages.
Notice of Allowance for U.S. Appl. No. 13/931,968, dated Mar. 23, 2015, 7 pages.
Final Office Action for U.S. Appl. No. 13/835,913, dated Mar. 26, 2015, 17 pages.
Final Office Action for U.S. Appl. No. 14/037,440, dated Feb. 11, 2015, 19 pages.
Non-Final Office Action for U.S. Appl. No. 14/068,839, dated Feb. 20, 2015, 15 pages.
Andreasen et al., "Session Description Protocol (SDP): Security Descriptions for Media Streams," Network Working Group, Request for Comments: 4568, Standards Track, The Internet Society, Jul. 2006, 40 pages.
Baugher et al., "The Secure Real-time Transport Protocol (SRTP)," Network Working Group, Request for Comments: 3711, Standards Track, The Internet Society, Mar. 2004, 51 pages.
Johnston, Alan et al., "Taking on WebRTC in an Enterprise," IEEE Communications Magazine, Apr. 2013, pp. 48-54, vol. 51, Issue 4.
Johnston et al., "WebRTC: APIs and RTCWEB Protocols of the HTML5 Real-Time Web," (Book), Second Edition, Smashwords Edition, Digital Codex LLC, Jun. 2013, 254 pages.
Mahy et al., "Traversal Using Relays around NAT (TURN) : Relay Extensions to Session Traversal Utilities for NAT (STUN)," Internet Engineering Task Force, Request for Comments: 5766, Standards Track, IETF Trust, Apr. 2010, 61 pages.
McGrew et al., "Datagram Transport Layer Security (DTLS) Extension to Establish Keys for the Secure Real-Time Transport Protocol (SRTP)," Internet Engineering Task Force, Request for Comments: 5764, Standards Track, IETF Trust, May 2010, 24 pages.
Singh, Kundan et al., "Building Communicating Web Applications Leveraging Endpoints and Cloud Resource Service," Presented at the Sixth International Conference on Cloud Computing, Jun. 28, 2013, Santa Clara, California, IEEE Computer Society, pp. 486-493.
Singh, Kundan et al., "Private Overlay of Enterprise Social Data and Interactions in the Public Web Context," presented at the 9th IEEE International Conference on Collaborative Computing: Networking, Applications and Worksharing (Collaboratecom), Oct. 20-23, 2013, Austin, Texas, IEEE, 10 pages.
Zimmermann et al., "ZRTP: Media Path Key Agreement for Unicast Secure RTP," Internet Engineering Task Force, Request for Comments: 6189, Informational, IETF Trust, Apr. 2011, 102 pages.
Search Report for British patent application GB1317121.0 dated Mar. 14, 2014, 3 pages.
Search Report for British patent application GB1317122.8 dated Mar. 11, 2014, 3 pages.
Berners-Lee, Tim, "Socially Aware Cloud Storage," Notes on web design, Aug. 17, 2009, http://www.w3.org/DesignIssues/CloudStorage.html, 9 pages.
Chandra, Ramesh et al., "Separating Web Applications from User Data Storage with BStore," presented at the USENIX Conference on Web Application Development, Jun. 2010, Boston, Massachusettes, 13 pages.
Davids, Carol et al., "SIP APIs for Voice and Video Communications on the Web," presented at the International Conference on Principles, Systems and Applications of IP Telecommunications (IPTcomm), Aug. 2011, Chicago, Illinois, 7 pages.
Geambasu, Roxana et al., "Organizing and Sharing Distributed Personal Web-Service Data," presented at the International World Wide Web Conference, Apr. 21-25, 2008, Beijing, China, International World Wide Web Conference Committee, pp. 755-764.
Hsu, F. et al., "Secure File System Services for Web 2.0 Applications," presented at the ACM Cloud Computing Security Workshop, Nov. 13, 2009, Chicago, Illinois, Association for Computing Machinery, 7 pages.
Joshi, R., "Data-Oriented Architecture: A Loosley Coupled Real-Time SOA," Whitepaper, Aug. 2007, Real-Time Innovations, Inc., http://rtcgroup.com/whitepapers/files/RTI_DataOrientedArchitecture_WhitePaper.pdf, 54 pages.
Vahdat, Amin et al., "WebFS: A Global Cache Coherent File System," UC Berkeley, Dec. 1996, retrieved Sep. 16, 2014 from https://www.cs.duke.edu/~vahdat/webfs/webfs.html, 12 pages.
Non-Final Office Action for U.S. Appl. No. 14/037,440, dated Sep. 12, 2014, 15 pages.

* cited by examiner

ENHANCING MEDIA CHARACTERISTICS DURING WEB REAL-TIME COMMUNICATIONS (WEBRTC) INTERACTIVE SESSIONS BY USING SESSION INITIATION PROTOCOL (SIP) ENDPOINTS, AND RELATED METHODS, SYSTEMS, AND COMPUTER-READABLE MEDIA

BACKGROUND

Field of the Disclosure

The technology of the disclosure relates generally to Web Real-Time Communications (WebRTC) interactive sessions.

Technical Background

Web Real-Time Communications (WebRTC) is an ongoing effort to develop industry standards for integrating real-time communications functionality into web clients, such as web browsers, to enable direct interaction with other web clients. This real-time communications functionality is accessible by web developers via standard markup tags, such as those provided by version 5 of the Hypertext Markup Language (HTML5), and client-side scripting Application Programming Interfaces (APIs) such as JavaScript APIs. More information regarding WebRTC may be found in "WebRTC: APIs and RTCWEB Protocols of the HTML5 Real-Time Web," by Alan B. Johnston and Daniel C. Burnett (2012 Digital Codex LLC), which is incorporated herein by reference in its entirety.

WebRTC provides built-in capabilities for establishing real-time video, audio, and/or data streams in both point-to-point and multi-party interactive sessions. The WebRTC standards are currently under joint development by the World Wide Web Consortium (W3C) and the Internet Engineering Task Force (IETF). Information on the current state of WebRTC standards can be found at, e.g., http://www.w3c.org and http://www/ietf.org.

To establish a WebRTC interactive session (e.g., a real-time video, audio, and/or data exchange), two web clients may retrieve WebRTC-enabled web applications, such as HTML5/JavaScript web applications, from a web application server. Through the web applications, the two web clients then engage in an initiation dialogue to communicate and reach an agreement on parameters that define characteristics of the WebRTC interactive session. This initiation dialogue may take the form of a WebRTC "offer/answer" exchange. In an offer/answer exchange, a first web client on a sender device sends an "offer" to a second web client on a recipient device. The offer includes a WebRTC session description object (also referred to as a "token") that specifies media types and capabilities that the first web client supports and prefers for use in the WebRTC interactive session. The second web client then responds with a WebRTC session description object "answer" that indicates which of the offered media types and capabilities are supported and acceptable by the second web client for use in the WebRTC interactive session. Once the WebRTC offer/answer exchange is complete, the web clients may then establish a direct peer connection with one another, and may begin an exchange of media or data packets transporting real-time communications. The peer connection between the web clients typically employs the Secure Real-time Transport Protocol (SRTP) to transport real-time media flows, and may utilize various other protocols for real-time data interchange.

The quality of the audio and/or video streams of a WebRTC interactive session may depend in large part on the capabilities of media components such as microphones, speakers, and/or webcams provided by computing devices on which WebRTC clients execute. Often, a computing device executing a WebRTC client is poorly equipped for providing high-quality audio and/or video in WebRTC interactive sessions. For instance, built-in microphones and speakers typically provided by conventional computers and laptops may create echoes and/or background noises. Likewise, webcams attached to or integrated into conventional computers may not provide sufficient resolution, frame rate, and/or color depth, as non-limiting examples. As a result, the quality of the user experience in the WebRTC interactive session may be significantly diminished.

SUMMARY OF THE DETAILED DESCRIPTION

Embodiments disclosed in the detailed description provide enhancing media characteristics during Web Real-Time Communications (WebRTC) interactive sessions by using Session Initiation Protocol (SIP) endpoints. Related methods, systems, and computer-readable media are also disclosed. In this regard, in one embodiment, a media redirection agent is provided (e.g., as part of a WebRTC client) to direct an audio and/or a video portion of a WebRTC interactive session to a SIP endpoint, thus providing enhanced media characteristics for the audio and/or video. The SIP endpoint may be, for instance, telephony or teleconferencing equipment or other SIP-enabled communications equipment that is more optimally equipped for presenting audio and/or video than a computing device on which the WebRTC client executes. The media redirection agent may be configured to intercept a WebRTC initiation token generated by the WebRTC client or received from a remote endpoint. Based on the WebRTC initiation token, the media redirection agent may generate a SIP endpoint WebRTC token, and may send the SIP endpoint WebRTC token to the remote endpoint. A WebRTC interactive session may then be established between the remote endpoint and the SIP endpoint based on the SIP endpoint WebRTC token. In some embodiments, the established WebRTC interactive session may include only an audio stream or a video stream, while some embodiments may provide that the established WebRTC interactive session includes both an audio stream and a video stream. According to some embodiments described herein, the SIP endpoint may provide one of an audio stream and a video stream of the established WebRTC interactive session, while the WebRTC client may provide the other. Some embodiments may further provide using an intermediately located media element and/or a SIP feature server to establish the WebRTC interactive session between the SIP endpoint and the remote endpoint. In this manner, such embodiments may provide enhanced audio and/or video for the WebRTC interactive session, resulting in an enhanced user experience.

In another embodiment, a method for enhancing media characteristics during WebRTC interactive sessions by using SIP endpoints is provided. The method comprises intercepting, by a media redirection agent of a WebRTC client executing on a computing device, a WebRTC initiation token. The method further comprises generating a SIP endpoint WebRTC token based on the WebRTC initiation token. The method also comprises sending the SIP endpoint WebRTC token to a remote endpoint. The method additionally comprises establishing a WebRTC interactive session between the remote endpoint and a SIP endpoint based on the SIP endpoint WebRTC token.

In another embodiment, a system for enhancing media characteristics during WebRTC interactive sessions by using SIP endpoints is provided. The system comprises at least one communications interface and a SIP endpoint. The system further comprises a first computing device communicatively coupled to the SIP endpoint via the at least one communications interface and executing a WebRTC client. The WebRTC client comprises a media redirection agent configured to intercept a WebRTC initiation token. The media redirection agent is further configured to generate a SIP endpoint WebRTC token based on the WebRTC initiation token. The media redirection agent is also configured to send the SIP endpoint WebRTC token to a remote endpoint. The media redirection agent is additionally configured to establish a WebRTC interactive session between the remote endpoint and the SIP endpoint based on the SIP endpoint WebRTC token.

In another embodiment, a non-transitory computer-readable medium is provided, having stored thereon computer-executable instructions to cause a processor to intercept a WebRTC initiation token. The computer-executable instructions further cause the processor to generate a SIP endpoint WebRTC token based on the WebRTC initiation token. The computer-executable instructions also cause the processor to send the SIP endpoint WebRTC token to a remote endpoint. The computer-executable instructions additionally cause the processor to establish a WebRTC interactive session between the remote endpoint and a SIP endpoint based on the SIP endpoint WebRTC token.

BRIEF DESCRIPTION OF THE FIGURES

The accompanying drawing figures incorporated in and forming a part of this specification illustrate several aspects of the disclosure, and together with the description serve to explain the principles of the disclosure.

DETAILED DESCRIPTION

Figure 1:
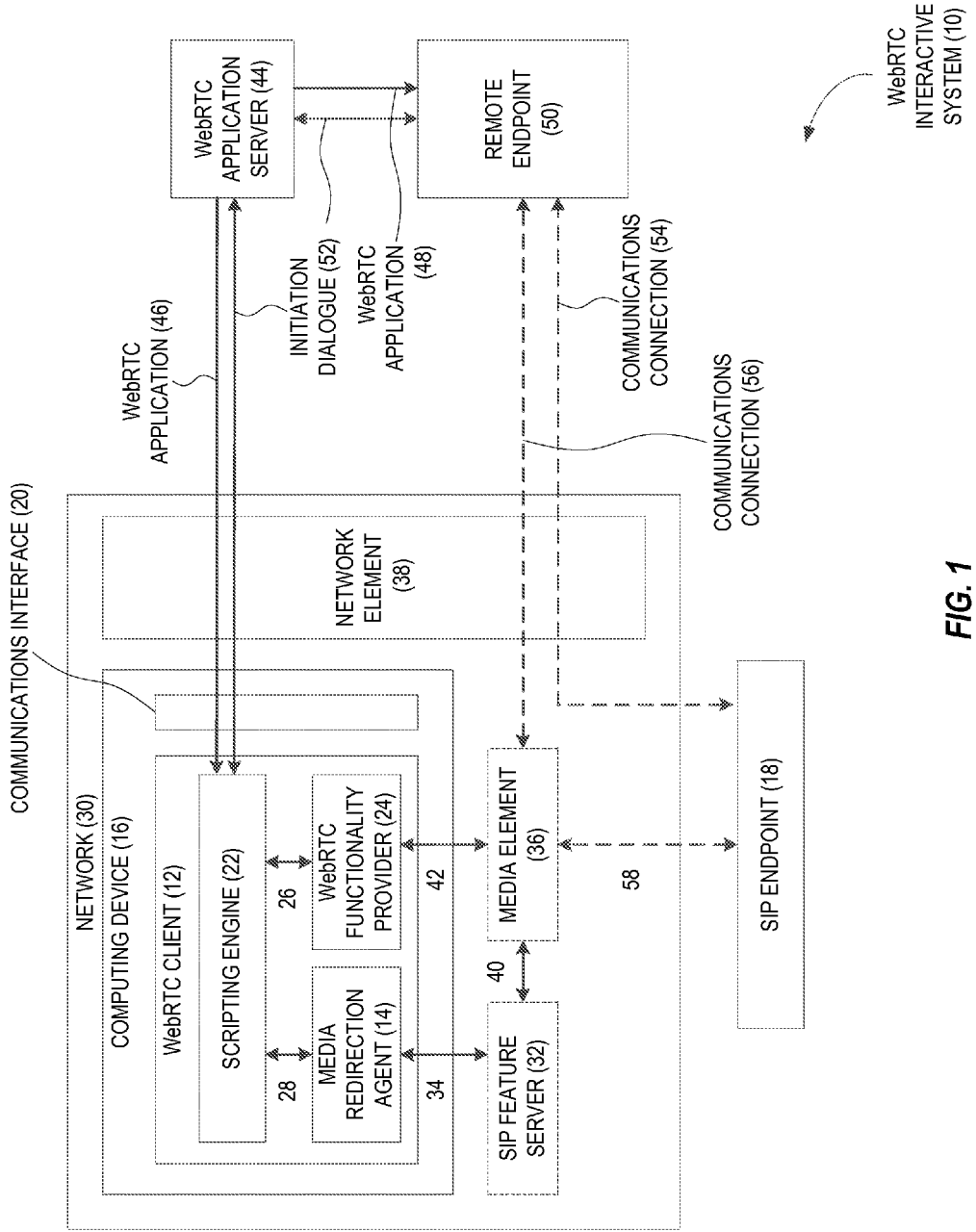
FIG. 1 is a conceptual diagram illustrating a Web Real-Time Communications (WebRTC) interactive system including a media redirection agent for enhancing media characteristics during WebRTC sessions by using a SIP endpoint.

With reference now to the drawing figures, several exemplary embodiments of the present disclosure are described. The word "exemplary" is used herein to mean "serving as an example, instance, or illustration." Any embodiment described herein as "exemplary" is not necessarily to be construed as preferred or advantageous over other embodiments.

Embodiments disclosed in the detailed description provide enhancing media characteristics during Web Real-Time Communications (WebRTC) interactive sessions by using Session Initiation Protocol (SIP) endpoints. Related methods, systems, and computer-readable media are also disclosed. In this regard, in one embodiment, a media redirection agent is provided (e.g., as part of a WebRTC client) to direct an audio and/or a video portion of a WebRTC interactive session to a SIP endpoint, thus providing enhanced media characteristics for the audio and/or video. The SIP endpoint may be, for instance, telephony or teleconferencing equipment or other SIP-enabled communications equipment that is more optimally equipped for presenting audio and/or video than a computing device on which the WebRTC client executes. The media redirection agent may be configured to intercept a WebRTC initiation token generated by the WebRTC client or received from a remote endpoint. Based on the WebRTC initiation token, the media redirection agent may generate a SIP endpoint WebRTC token, and may send the SIP endpoint WebRTC token to the remote endpoint. A WebRTC interactive session may then be established between the remote endpoint and the SIP endpoint based on the SIP endpoint WebRTC token. In some embodiments, the established WebRTC interactive session may include only an audio stream or a video stream, while some embodiments may provide that the established WebRTC interactive session includes both an audio stream and a video stream. According to some embodiments described herein, the SIP endpoint may provide one of an audio stream and a video stream of the established WebRTC interactive session, while the WebRTC client may provide the other. Some embodiments may further provide using an intermediately located media element and/or a SIP feature server to establish the WebRTC interactive session between the SIP endpoint and the remote endpoint. In this manner, such embodiments may provide enhanced audio and/or video for the WebRTC interactive session, resulting in an enhanced user experience.

In this regard, FIG. 1 illustrates an exemplary WebRTC interactive system 10 providing enhanced media characteristics during WebRTC interactive sessions by using SIP endpoints as disclosed herein. In particular, the WebRTC interactive system 10 provides a WebRTC client 12, including a media redirection agent 14, which executes on a computing device 16. The media redirection agent 14 may be implemented as a plug-in or extension to the WebRTC client 12, or may be integrated as native functionality of the WebRTC client 12. The media redirection agent 14 provides a mechanism by which an audio stream and/or a video stream of a WebRTC interactive session, in which the WebRTC client 12 is participating, may be redirected to a SIP endpoint 18. As used herein, a "WebRTC interactive session" refers to operations for carrying out an initiation dialogue (e.g., a WebRTC offer/answer exchange, as a non-limiting example), establishing a peer connection, and commencing a WebRTC interactive flow between two or more endpoints. A "WebRTC interactive flow," as disclosed herein, refers to an interactive media flow and/or an interactive data flow that passes between or among two or more endpoints according to the WebRTC standards and protocols. As non-limiting examples, an interactive media flow constituting a WebRTC interactive flow may comprise a real-time audio stream and/or a real-time video stream, or other real-time media and/or data streams.

Some embodiments may provide that the computing device 16 on which the WebRTC client 12 executes may be any computing device having network communications capabilities, such as a smartphone, a tablet computer, a dedicated web appliance, a media server, a desktop or server computer, or a purpose-built communications device, as non-limiting examples. The computing device 16 includes a communications interface 20 for connecting the computing device 16 to one or more public and/or private networks (not shown). In some embodiments, the elements of the computing device 16 may be distributed across more than one computing device 16.

In the embodiment illustrated in FIG. 1, the WebRTC client 12 comprises a scripting engine 22 and a WebRTC functionality provider 24. The scripting engine 22 enables client-side applications written in a scripting language, such as JavaScript, to be executed within the WebRTC client 12. The scripting engine 22 also provides an application programming interface (API) to facilitate communications with other functionality providers within the WebRTC client 12 and/or with other web clients, user devices, or web servers. The WebRTC functionality provider 24 implements the protocols, codecs, and APIs necessary to enable real-time interactive sessions via WebRTC. The scripting engine 22 and the WebRTC functionality provider 24 are communicatively coupled via a set of defined APIs, as indicated by bidirectional arrow 26. Additionally, the scripting engine 22 and the media redirection agent 14 are communicatively coupled, as indicated by bidirectional arrow 28.

In the example of FIG. 1, the WebRTC interactive system 10 includes a network 30 that provides networked computing and communications resources to users. The network 30 may comprise, as non-limiting examples, an enterprise network and/or a network provided by a mobile carrier or other internet service provider. The network 30 includes the WebRTC client 12 executing on the computing device 16. For purposes of clarity, the network 30 includes only one WebRTC client 12. However, it is to be understood that other embodiments may include multiple WebRTC clients 12. The network 30 may further provide a SIP feature server 32 that is communicatively coupled to the media redirection agent 14, as indicated by bidirectional arrow 34. The SIP feature server 32 may comprise one or more servers or other computing devices configured to send and receive SIP messages (not shown), and to execute an application or sequence of applications based on the SIP messages.

The network 30 in FIG. 1 may also include additional elements, such as a media element 36 and a network element 38. The media element 36 may be communicatively coupled to the SIP feature server 32 and the WebRTC functionality provider 24 of the WebRTC client 12, as indicated by bidirectional arrows 40 and 42, respectively. The media element 36 may comprise a media server or other computing device configured to provide media handling functionality in conjunction with a WebRTC interactive session, such as translating media streams specified by the WebRTC protocols to media streams according to SIP, and vice versa. In some embodiments, the media element 36 may be incorporated into the SIP feature server 32. The network element 38 may include one or more devices such as a router, a firewall, or a Traversal Using Relays around Network Address Translation (TURN) server, or a combination thereof. The functionality of the media element 36 and/or the network element 38 may be distributed across more than one computing device 16. It is to be understood that, while the media element 36 and the network element 38 are illustrated as part of the network 30, one or both of the media element 36 and/or the network element 38 may reside in a different public and/or private network than the WebRTC client 12.

External to the network 30 is a WebRTC application server 44, which serves WebRTC applications 46 and 48 to the WebRTC client 12 and to a remote endpoint 50 to requesting web clients. In some embodiments, the WebRTC application server 44 may be a single server, while in some applications the WebRTC application server 44 may comprise multiple servers that are communicatively coupled to each other. The remote endpoint 50 may be any computing or communications device having network communications capabilities, such as a smartphone, a tablet computer, a dedicated web appliance, or a desktop computer, as non-limiting examples, and may include a WebRTC client having functionality corresponding to that of the WebRTC client 12. It is to be understood that either or both of the WebRTC application server 44 and the remote endpoint 50 may reside within the network 30, or may reside within a public or private network communicatively coupled to the network 30.

To establish a WebRTC interactive session, the WebRTC client 12 and the remote endpoint 50 each downloads the WebRTC applications 46 and 48, respectively, from the WebRTC application server 44 (e.g., via Hyper Text Transfer Protocol (HTTP)/Hyper Text Transfer Protocol Secure (HTTPS) connections). In some embodiments, the WebRTC applications 46 and 48 may comprise HTML5/JavaScript web applications that provide rich user interfaces using HTML5, and that use JavaScript to handle user input and to communicate with the WebRTC application server 44. It is to be understood that one or both of the WebRTC applications 46 and 48 may comprise multiple, interoperable WebRTC applications tailored for specific characteristics (such as operating systems and/or platforms) of the WebRTC client 12 and/or the remote endpoint 50.

In a typical WebRTC interactive session, the WebRTC client 12 and the remote endpoint 50 engage in an initiation dialogue 52 with one another to negotiate media types and capabilities of the desired WebRTC interactive session. In some embodiments, the initiation dialogue 52 may include a WebRTC offer/answer exchange in which WebRTC session description objects (not shown) are exchanged between the WebRTC client 12 and the remote endpoint 50 via the WebRTC application server 44. After the initiation dialogue 52 is complete, a WebRTC interactive flow (not shown), comprising audio, video, and/or data streams, is established directly between the WebRTC client 12 and the remote endpoint 50 via a peer connection (not shown).

However, media characteristics (e.g., an audio quality and/or video quality) of the WebRTC interactive flow for a user (not shown) of the WebRTC client 12 may depend on the capabilities of the computing device 16 on which the WebRTC client 12 executes. For example, if the computing device 16 is a laptop or tablet computer, built-in microphone and speakers (not shown) provided by the computing device 16 may be poorly suited for providing high-quality audio in WebRTC interactive sessions. Similarly, a webcam (not shown) attached to or integrated into the computing device 16 may provide relatively inferior video quality. Consequently, a quality of user experience for the user of the WebRTC client 12 in the WebRTC interactive session may not be enhanced.

In this regard, the media redirection agent 14 is provided to enhance media characteristics during WebRTC interactive sessions by using the SIP endpoint 18. The SIP endpoint 18 may comprise, for instance, telephony or teleconferencing equipment (or other SIP-enabled equipment) that is more optimally equipped for presenting audio and/or video than the computing device 16. As described in greater detail below, the media redirection agent 14 may be configured to intercept a WebRTC session initiation token (not shown) generated by the WebRTC client 12 or received from the remote endpoint 50. The media redirection agent 14 may then generate a SIP endpoint WebRTC token (not shown) based on the WebRTC session initiation token. Exemplary operations for generating the SIP endpoint WebRTC token in various scenarios (using the media element 36 and/or the SIP feature server 32, as non-limiting examples) are discussed below. The media redirection agent 14 causes the SIP endpoint WebRTC token to be sent to the remote endpoint 50, and a WebRTC interactive session may then be established between the remote endpoint 50 and the SIP endpoint 18 based on the SIP endpoint WebRTC token. The audio and/or video capabilities of the SIP endpoint 18 may thus be employed to enhance the media characteristics of the audio and/or video stream of the WebRTC interactive session.

In some embodiments, if the SIP endpoint 18 is configured to provide WebRTC functionality natively, the SIP endpoint 18 and the remote endpoint 50 may be directly linked via a communications connection 54 over which the WebRTC interactive session is conducted. However, if the SIP endpoint 18 does not natively support WebRTC functionality, the SIP endpoint 18 may be linked to the remote endpoint 50 by a communications connection 56 passing through the media element 36. The media element 36 may be configured to route an audio and/or video portion of the WebRTC interactive session to the SIP endpoint 18 (as indicated by bidirectional arrow 58). In some embodiments, one of an audio stream and a video stream of the WebRTC interactive session may be routed to the SIP endpoint 18, while the other of the audio stream and the video stream of the WebRTC interactive session may be routed to the WebRTC functionality provider 24 of the WebRTC client 12.

Figure 2:
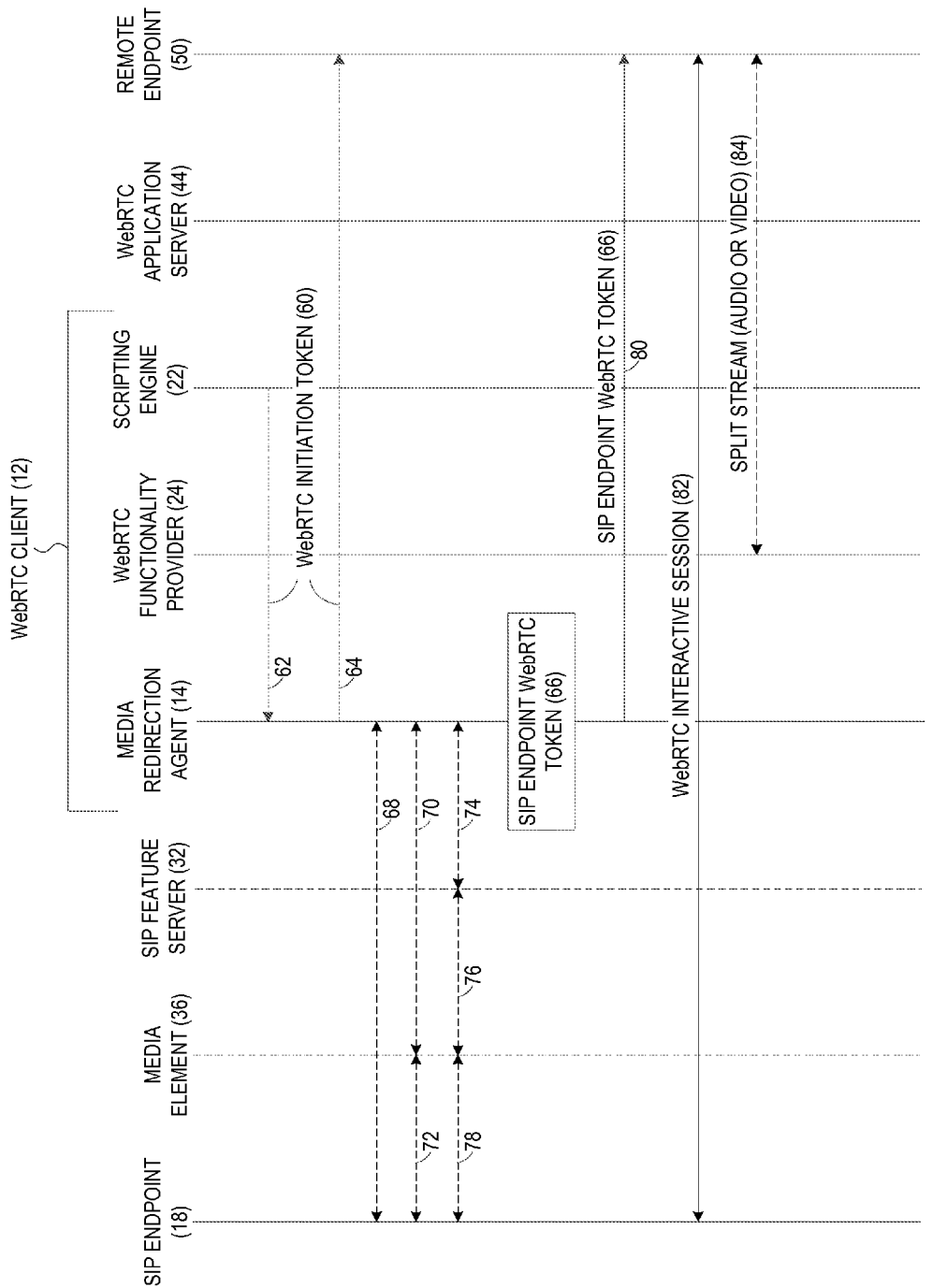
FIG. 2 is a diagram illustrating exemplary high-level communications flows among elements of the WebRTC interactive system of FIG. 1 for the media redirection agent of FIG. 1 to provide enhanced media characteristics for a WebRTC interactive session.
Figure 3:
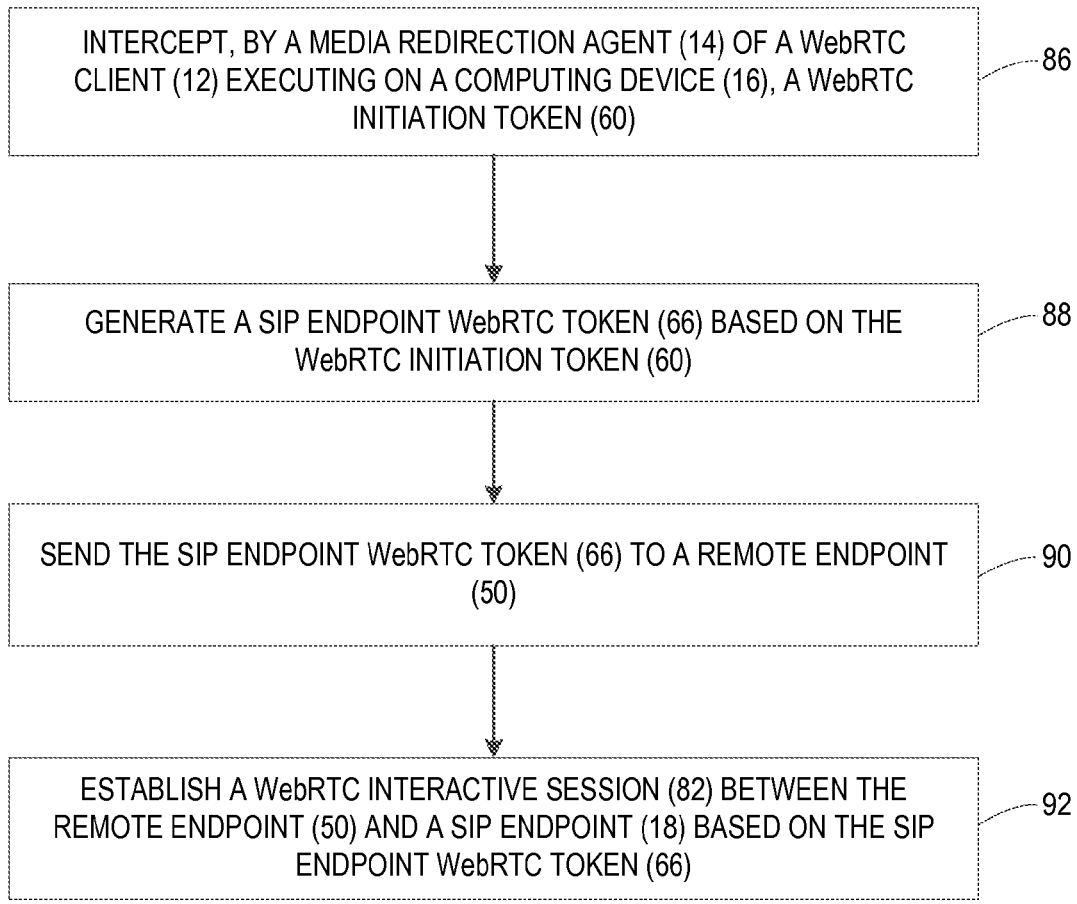
FIG. 3 is a flowchart illustrating exemplary operations of the media redirection agent of FIG. 1 for enhancing audio during WebRTC interactive sessions.
Figure 4:
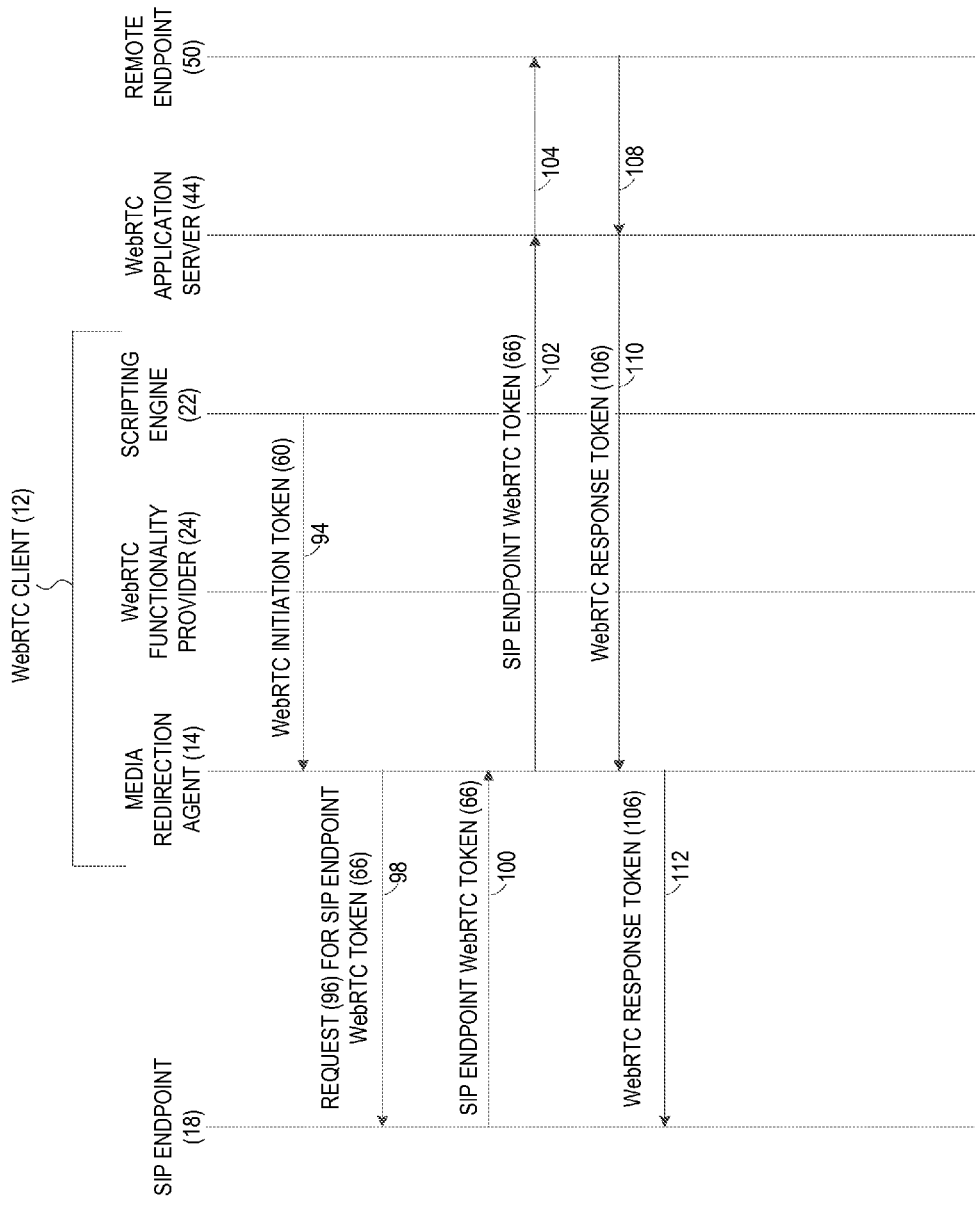
FIG. 4 is a diagram illustrating exemplary communications flows among elements of the WebRTC interactive system of FIG. 1 to provide enhanced media characteristics for a WebRTC interactive session that is initiated by a WebRTC client and that uses a SIP endpoint providing native WebRTC support.
Figure 5:
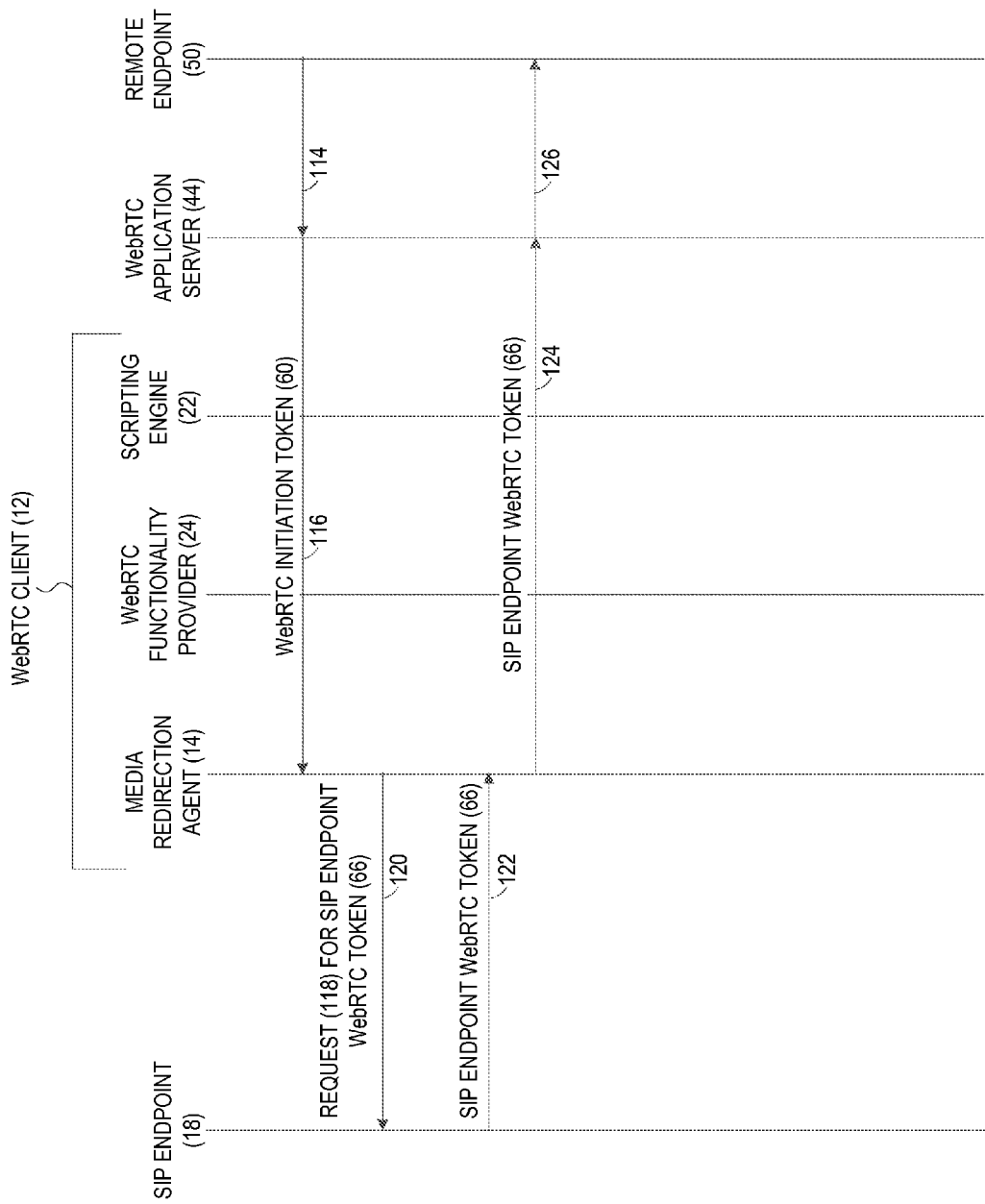
FIG. 5 is a diagram illustrating exemplary communications flows among elements of the WebRTC interactive system of FIG. 1 to provide enhanced media characteristics for a WebRTC interactive session that is initiated by a remote endpoint and that uses a SIP endpoint providing native WebRTC support.
Figure 6:
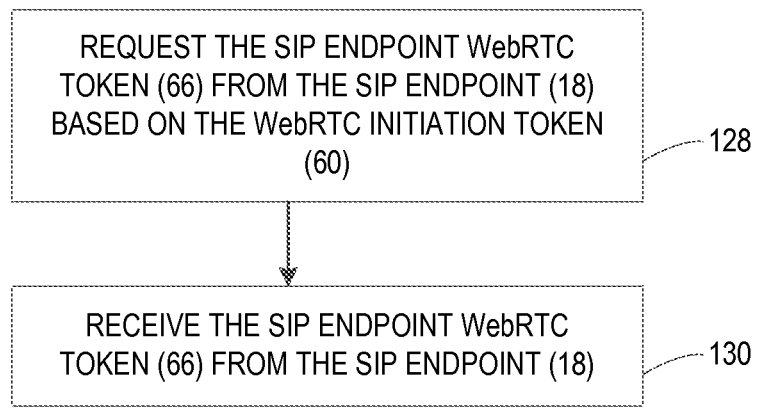
FIG. 6 is a flowchart illustrating further exemplary operations of the media redirection agent of FIG. 1 for establishing a communications connection for a WebRTC client-initiated WebRTC interactive session using a SIP endpoint providing native WebRTC support.

To illustrate communications flows and operations of various embodiments of the present disclosure, the following figures are provided. FIGS. 2 and 3, and the descriptions thereof, show broad embodiments for enhancing media characteristics of WebRTC interactive sessions using the SIP endpoint 18 of FIG. 1. Subsequent figures then illustrate additional embodiments within the scope of the present disclosure. FIGS. 4-6 illustrate embodiments in which the SIP endpoint 18 possesses native WebRTC functionality. FIGS. 7-10 show embodiments using the media element 36, with FIGS. 7 and 8 relating to WebRTC interactive sessions initiated by the WebRTC client 12, and FIGS. 9 and 10 pertaining to WebRTC interactive sessions initiated by the remote endpoint 50. FIGS. 11A-11B, 12A-12B, and 13 illustrate embodiments providing "split" WebRTC audio and video streams, with FIGS. 11A-11B relating to WebRTC interactive sessions initiated by the WebRTC client 12, and FIGS. 12A-12B pertaining to WebRTC interactive sessions initiated by the remote endpoint 50. Finally, FIGS. 14A and 14B show embodiments in which communications between the media redirection agent 14 and the media element 36 are facilitated by the SIP feature server 32.

To illustrate exemplary high-level communications flows among elements of the WebRTC interactive system 10 of FIG. 1 for the media redirection agent 14 of FIG. 1 to provide enhanced media characteristics for a WebRTC interactive session, FIG. 2 is provided. In FIG. 2, the SIP endpoint 18, the media element 36, the SIP feature server 32, the media redirection agent 14, the WebRTC functionality provider 24, the scripting engine 22, the WebRTC application server 44, and the remote endpoint 50 of FIG. 1 are each represented by a vertical line. It is to be understood that the media redirection agent 14, the WebRTC functionality provider 24, and the scripting engine 22 together constitute the WebRTC client 12 of FIG. 1.

As seen in FIG. 2, a WebRTC initiation token 60 is intercepted by the media redirection agent 14 of the WebRTC client 12. In some embodiments, the WebRTC initiation token 60 may be a WebRTC Session Description Protocol (SDP) object representing a WebRTC offer generated by the scripting engine 22 of the WebRTC client 12, as indicated by arrow 62. Some embodiments may provide that the WebRTC initiation token 60 is a WebRTC SDP object representing a WebRTC offer generated by the remote endpoint 50, as indicated by arrow 64.

Based on the WebRTC initiation token 60, the media redirection agent 14 generates a SIP endpoint WebRTC token 66. The SIP endpoint WebRTC token 66 includes connection information for establishing a WebRTC connection between the SIP endpoint 18 and the remote endpoint 50. In embodiments wherein the WebRTC initiation token 60 represents a WebRTC offer generated by the scripting engine 22 of the WebRTC client 12, the SIP endpoint WebRTC token 66 may represent a WebRTC offer to be sent to the remote endpoint 50. Conversely, in embodiments wherein the WebRTC initiation token 60 represents a WebRTC offer generated by the remote endpoint 50, the SIP endpoint WebRTC token 66 may represent a WebRTC answer to be sent to the remote endpoint 50.

Embodiments of the media redirection agent 14 disclosed herein may generate the SIP endpoint WebRTC token 66 with the assistance of one or more of the other elements shown in FIG. 1. If the SIP endpoint 18 provides native support for WebRTC functionality, the media redirection agent 14 may request the SIP endpoint WebRTC token 66 from the SIP endpoint 18, as indicated by bidirectional arrow 68. In embodiments where the SIP endpoint 18 lacks WebRTC capabilities, the media redirection agent 14 may communicate with the media element 36 (as indicated by bidirectional arrow 70), which in turn may communicate with the SIP endpoint 18 using SIP (bidirectional arrow 72).

Generation of the SIP endpoint WebRTC token 66 may also be facilitated by the SIP feature server 32. In such embodiments, the media redirection agent 14 may exchange SIP messages with the SIP feature server 32 (as indicated by bidirectional arrow 74). The SIP feature server 32 then communicates with the media element 36 (bidirectional arrow 76), and the media element 36 engages in SIP communications with the SIP endpoint 18 (bidirectional arrow 78).

After generating the SIP endpoint WebRTC token 66, the media redirection agent 14 sends the SIP endpoint WebRTC token 66 to the remote endpoint 50, as indicated by arrow 80. It is to be understood that sending the SIP endpoint WebRTC token 66 to the remote endpoint 50 may include sending the SIP endpoint WebRTC token 66 to the WebRTC application server 44, which may then relay the SIP endpoint WebRTC token 66 to the remote endpoint 50. If the SIP endpoint WebRTC token 66 represents a WebRTC offer generated by the WebRTC client 12, the remote endpoint 50 may respond with a WebRTC answer (not shown).

Based on the SIP endpoint WebRTC token 66, a WebRTC interactive session 82 may be established between the SIP endpoint 18 and the remote endpoint 50. The WebRTC interactive session 82 may include only an audio stream or a video stream, or may include both audio and video. In embodiments where the WebRTC interactive session 82 includes only one of an audio stream and a video stream, a separate split stream 84 including the other of the audio stream and the video stream may be established between the remote endpoint 50 and the WebRTC functionality provider 24 of the WebRTC client 12. In this manner, as a non-limiting example, the capabilities of the SIP endpoint 18 may be used to enhance audio characteristics of the WebRTC interactive session 82, while the WebRTC client 12 provides video via the split stream 84.

To illustrate exemplary operations of the media redirection agent 14 of FIG. 1 for enhancing audio during WebRTC interactive sessions, FIG. 3 is provided. The operations of FIG. 3 correspond to the communications flows described above with respect to FIG. 2. For the sake of clarity, elements of FIGS. 1 and 2 are referenced in describing FIG. 3. In FIG. 3, operations begin with the media redirection agent 14 of the WebRTC client 12 executing on a computing device 16 intercepting a WebRTC initiation token 60 (block 86). As noted above, the WebRTC initiation token 60 may be generated by the scripting engine 22 of the WebRTC client 12, or may be received from the remote endpoint 50.

The media redirection agent 14 then generates a SIP endpoint WebRTC token 66 based on the WebRTC initiation token 60 (block 88). In some embodiments, the SIP endpoint WebRTC token 66 may represent a WebRTC offer, or may constitute a WebRTC answer to be sent in response to a WebRTC offer received from the remote endpoint 50. The media redirection agent 14 sends the SIP endpoint WebRTC token 66 to the remote endpoint 50 (block 90). Based on the SIP endpoint WebRTC token 66, a WebRTC interactive session 82 is established between the remote endpoint 50 and a SIP endpoint 18 (block 92).

In some embodiments, the SIP endpoint 18 may provide native WebRTC support, enabling the SIP endpoint 18 to generate a WebRTC offer or answer itself, and to engage in a WebRTC interactive session 82. Accordingly, the media redirection agent 14 in such embodiments may communicate directly with the SIP endpoint 18 (i.e., without the need for the media element 36) to generate the SIP endpoint WebRTC token 66. To illustrate exemplary communications flows and operations in such embodiments, FIGS. 4-6 are provided. FIG. 4 is a diagram showing exemplary communications flows among elements of the WebRTC interactive system 10 of FIG. 1 for WebRTC interactive sessions initiated by the WebRTC client 12. Similarly, FIG. 5 shows exemplary communications flows for WebRTC interactive sessions initiated by the remote endpoint 50. FIG. 6 is a flowchart illustrating further exemplary operations, corresponding to the communications flows of FIGS. 4 and 5, of the media redirection agent 14 of FIG. 1. For the sake of clarity, elements of FIGS. 1 and 2 are referenced in describing FIGS. 4-6.

In FIG. 4, the SIP endpoint 18, the media redirection agent 14, the WebRTC functionality provider 24, the scripting engine 22, the WebRTC application server 44, and the remote endpoint 50 of FIG. 1 are each represented by a vertical line. The media redirection agent 14, the WebRTC functionality provider 24, and the scripting engine 22 together constitute the WebRTC client 12 of FIG. 1. For the sake of clarity, elements of FIGS. 1 and 2 are referenced in describing FIG. 4. Referring first to FIG. 4, the WebRTC initiation token 60 generated by the scripting engine 22 of the WebRTC client 12 is intercepted by the media redirection agent 14 (as indicated by arrow 94). Based on the WebRTC initiation token 60, the media redirection agent 14 sends a request 96 for the SIP endpoint WebRTC token 66 to the SIP endpoint 18 (arrow 98). As noted above, the SIP endpoint 18 in this example provides native WebRTC support and functionality. Accordingly, the SIP endpoint 18 provides the SIP endpoint WebRTC token 66 to the media redirection agent 14 in response to the request 96 (arrow 100).

The SIP endpoint WebRTC token 66 is then sent to the remote endpoint 50 via the WebRTC application server 44 as a WebRTC offer (arrows 102 and 104). If a user of the remote endpoint 50 wishes to participate in a WebRTC interactive session, the remote endpoint 50 returns a WebRTC response token 106 to the media redirection agent 14 via the WebRTC application server 44 (arrows 108 and 110). The media redirection agent 14 then forwards the WebRTC response token 106 to the SIP endpoint 18 (arrow 112). Subsequently, a WebRTC interactive session (not shown) is established between the SIP endpoint 18 and the remote endpoint 50 based on the SIP endpoint WebRTC token 66 and the WebRTC response token 106.

FIG. 5 illustrates the same elements as FIG. 4, but in an embodiment in which the remote endpoint 50 seeks to initiate a WebRTC interactive session. Accordingly, as seen in FIG. 5, the WebRTC initiation token 60 is received by the WebRTC client 12 from the remote endpoint 50, and is intercepted by the media redirection agent 14 (arrows 114 and 116). The media redirection agent 14 then sends a request 118 for the SIP endpoint WebRTC token 66 to the SIP endpoint 18 (arrow 120). Because the SIP endpoint 18 in this example provides support for WebRTC media, the request 118 may comprise, for example, a WebRTC SDP offer. The SIP endpoint 18 then provides the SIP endpoint WebRTC token 66 (e.g., a WebRTC SDP answer) to the media redirection agent 14 in response to the request 118 (arrow 122). The SIP endpoint WebRTC token 66 is then sent to the remote endpoint 50 via the WebRTC application server 44 as a WebRTC answer (arrows 124 and 126). A WebRTC interactive session (not shown) may then be established between the SIP endpoint 18 and the remote endpoint 50 based on the SIP endpoint WebRTC token 66 and the WebRTC initiation token 60.

FIG. 6 is a flowchart illustrating further exemplary operations of the media redirection agent 14 of FIG. 1 for establishing a communications connection for a WebRTC client-initiated WebRTC interactive session using a SIP endpoint 18 providing native WebRTC support. The operations of FIG. 6 correspond to operations of block 88 of FIG. 3 for generating the SIP endpoint WebRTC token 66, and further correspond to the communications flows described above with respect to FIGS. 4 and 5. In FIG. 6, operations for generating the SIP endpoint WebRTC token 66 include the media redirection agent 14 of FIG. 1 requesting the SIP endpoint WebRTC token 66 from the SIP endpoint 18 based on the WebRTC initiation token 60 (block 128). The media redirection agent 14 may then receive the SIP endpoint WebRTC token 66 from the SIP endpoint 18 (block 130). The SIP endpoint WebRTC token 66 may then be used to establish a WebRTC interactive session (not shown) as described above.

Figure 7:
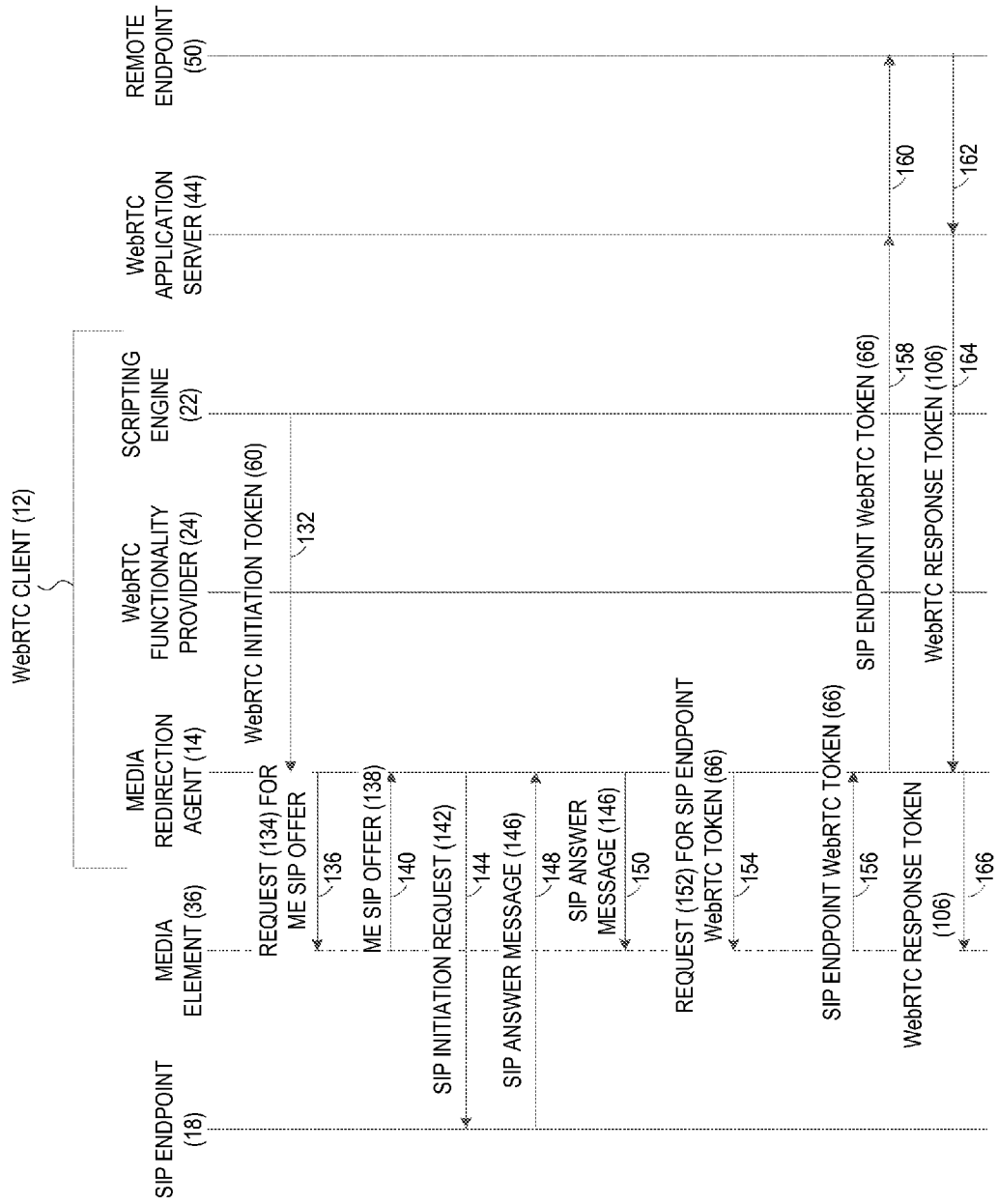
FIG. 7 is a diagram illustrating exemplary communications flows among elements of the WebRTC interactive system of FIG. 1 to provide enhanced media characteristics for a WebRTC interactive session that is initiated by a WebRTC client and that includes an intermediate media element.
Figure 8:
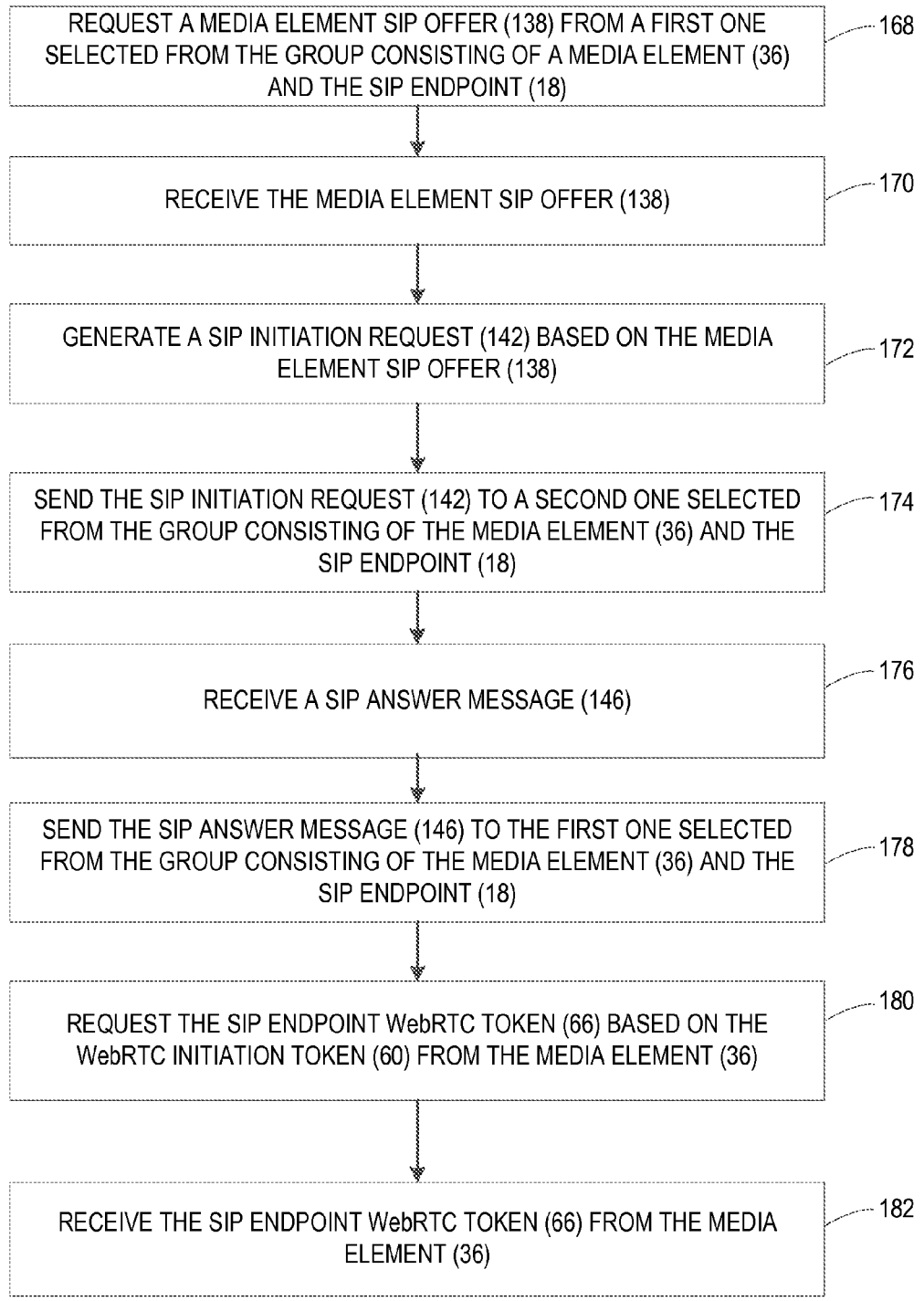
FIG. 8 is a flowchart illustrating further exemplary operations of the media redirection agent of FIG. 1 for establishing a communications connection for a WebRTC client-initiated WebRTC interactive session between a SIP endpoint and a remote endpoint using an intermediate media element.

According to some embodiments disclosed herein, the SIP endpoint 18 may not provide native WebRTC functionality, necessitating the use of the media element 36 by the media redirection agent 14 in generating the SIP endpoint WebRTC token 66. In particular, it may be necessary for the media element 36 to act as a "go-between" between the SIP endpoint 18 and the remote endpoint 50 in a WebRTC interactive session. This may be accomplished by establishing a SIP-based communications session between the SIP endpoint 18 and the media element 36, and establishing a WebRTC interactive session between the media element 36 and the remote endpoint 50. In this regard, FIGS. 7-10 are provided to illustrate embodiments including the media element 36. FIGS. 7 and 8 relate to embodiments in which the WebRTC initiation token 60 is generated by the WebRTC client 12 (e.g., as a WebRTC offer), while FIGS. 9 and 10 pertain to embodiments in which the WebRTC initiation token 60 is received by the WebRTC client 12 from the remote endpoint 50. In describing FIGS. 7-10, elements of FIGS. 1 and 2 are referenced for the sake of clarity.

FIG. 7 is a diagram illustrating exemplary communications flows among elements of the WebRTC interactive system 10 of FIG. 1 to provide enhanced media characteristics for a WebRTC interactive session that is initiated by the WebRTC client 12 and that includes the media element 36. In FIG. 7, the SIP endpoint 18, the media element 36, the media redirection agent 14, the WebRTC functionality provider 24, the scripting engine 22, the WebRTC application server 44, and the remote endpoint 50 of FIG. 1 are each represented by a vertical line. The media redirection agent 14, the WebRTC functionality provider 24, and the scripting engine 22 together constitute the WebRTC client 12 of FIG. 1.

As seen in FIG. 7, the media redirection agent 14 intercepts the WebRTC initiation token 60 generated by the scripting engine 22 of the WebRTC client 12 (as indicated by arrow 132). Because the SIP endpoint 18 in this example only supports SIP and is not capable of generating the SIP endpoint WebRTC token 66 itself, the media redirection agent 14 in this example sends a request 134 for a media element (ME) SIP offer to the media element 36 (arrow 136). The media redirection agent 14 then receives a media element SIP offer 138 from the media element 36 (arrow 140).

Using the media element SIP offer 138, the media redirection agent 14 generates and sends a SIP initiation request 142 to the SIP endpoint 18 (arrow 144). The SIP initiation request 142 may comprise, for instance, a SIP INVITE message. The media redirection agent 14 then receives a SIP answer message 146 from the SIP endpoint 18 (arrow 148). As a non-limiting example, the SIP answer message 146 may comprise a SIP 200 OK message. The SIP answer message 146 is then relayed to the media element 36 (arrow 150). In this manner, a SIP-based communications session (not shown) may be established between the media element 36 and the SIP endpoint 18.

It is to be understood that the sequence of communications flows for establishing the SIP-based communications session between the media element 36 and the SIP endpoint 18 described above is one non-limiting example. Other embodiments within the scope of the present disclosure may employ a different sequence of communications flows to establish the SIP-based communications session. For example, the media redirection agent 14 may request and receive the media element SIP offer 138 from the SIP endpoint 18, send the SIP initiation request 142 to and receive the SIP answer message 146 from the media element 36, and send the SIP answer message 146 to the SIP endpoint 18.

With continuing reference to FIG. 7, the media redirection agent 14 next sends a request 152 for the SIP endpoint WebRTC token 66 to the media element 36 (arrow 154). The media element 36 provides the SIP endpoint WebRTC token 66 to the media redirection agent 14 in response to the request 152 (arrow 156). The media redirection agent 14 then sends the SIP endpoint WebRTC token 66 to the remote endpoint 50 via the WebRTC application server 44 as a WebRTC offer (arrows 158 and 160). If a user of the remote endpoint 50 wishes to participate in a WebRTC interactive session, the remote endpoint 50 returns a WebRTC response token 106 to the media redirection agent 14 via the WebRTC application server 44 (arrows 162 and 164). The media redirection agent 14 then forwards the WebRTC response token 106 to the media element 36 (arrow 166). Subsequently, a WebRTC interactive session (not shown) is effectively established between the SIP endpoint 18 and the remote endpoint 50 via the media element 36 based on the SIP endpoint WebRTC token 66 and the WebRTC response token 106.

To illustrate further exemplary operations of the media redirection agent 14 of FIG. 1 for establishing a communications connection for a WebRTC client-initiated WebRTC interactive session between a SIP endpoint 18 and a remote endpoint 50 using an intermediate media element 36, FIG. 8 is provided. The operations illustrated by of FIG. 8 correspond to operations of block 88 of FIG. 3 for generating the SIP endpoint WebRTC token 66 in some embodiments, and further correspond to the communications flows described above with respect to FIG. 7.

In FIG. 8, operations for generating the SIP endpoint WebRTC token 66 begin with the media redirection agent 14 requesting a media element SIP offer 138 from a first one selected from the group consisting of a media element 36 and the SIP endpoint 18 (block 168). The media element SIP offer 138 will be used to establish a SIP-based communications session between the media element 36 and the SIP endpoint 18. The media redirection agent 14 receives the media element SIP offer 138 (block 170). The media redirection agent 14 then generates a SIP initiation request 142 based on the media element SIP offer 138 (block 172). The SIP initiation request 142 is sent by the media redirection agent 14 to a second one selected from the group consisting of the media element 36 and the SIP endpoint 18 (block 174).

The media redirection agent 14 next receives a SIP answer message 146 (block 176). The SIP answer message 146 is sent to the first of the media element 36 and the SIP endpoint 18 (block 178). Subsequently, the media redirection agent 14 requests the SIP endpoint WebRTC token 66 based on the WebRTC initiation token 60 from the media element 36 (block 180). The media redirection agent 14 receives the SIP endpoint WebRTC token 66 from the media element 36 (block 182). The SIP endpoint WebRTC token 66 may then be used to establish a WebRTC interactive session (not shown) between the SIP endpoint 18 and the remote endpoint 50 via the media element 36, as described above.

Figure 9:
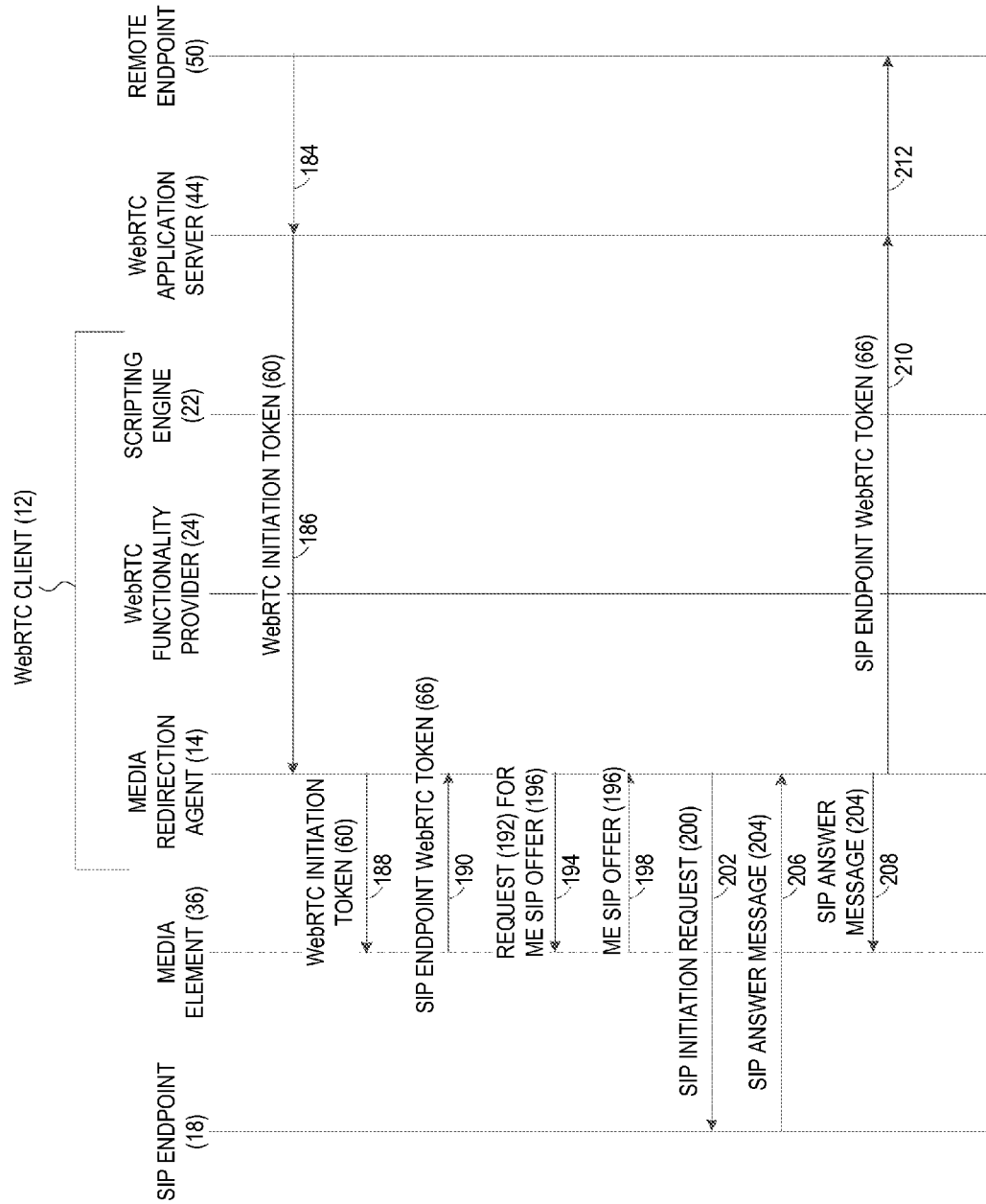
FIG. 9 is a diagram illustrating exemplary communications flows among elements of the WebRTC interactive system of FIG. 1 to provide enhanced media characteristics for a WebRTC interactive session that is initiated by a remote endpoint and that includes an intermediate media element.

FIG. 9 illustrates exemplary communications flows among elements of the WebRTC interactive system 10 of FIG. 1 to provide enhanced media characteristics for a WebRTC interactive session that is initiated by the remote endpoint 50 and that includes the media element 36. The SIP endpoint 18, the media element 36, the media redirection agent 14, the WebRTC functionality provider 24, the scripting engine 22, the WebRTC application server 44, and the remote endpoint 50 of FIG. 1 are each represented in FIG. 9 by a vertical line. The media redirection agent 14, the WebRTC functionality provider 24, and the scripting engine 22 together make up the WebRTC client 12 of FIG. 1.

In the example of FIG. 9, the WebRTC initiation token 60 is received from the remote endpoint 50 via the WebRTC application server 44 (e.g., as a WebRTC offer), and is intercepted by the media redirection agent 14 (as indicated by arrows 184 and 186). The media redirection agent 14 sends the WebRTC initiation token 60 to the media element 36 (arrow 188), and receives the SIP endpoint WebRTC token 66 from the media element 36 in response (arrow 190).

The media redirection agent 14 in FIG. 9 next sends a request 192 for a media element (ME) SIP offer 196 to the media element 36 (arrow 194), and receives the media element SIP offer 196 from the media element 36 (arrow 198). Using the media element SIP offer 196, the media redirection agent 14 generates and sends a SIP initiation request 200 to the SIP endpoint 18 (arrow 202). The SIP initiation request 200 may comprise a SIP INVITE message, as a non-limiting example. The media redirection agent 14 may then receive a SIP answer message 204 from the SIP endpoint 18 (arrow 206). The SIP answer message 204 may comprise, for instance, a SIP OK message. The SIP answer message 204 is then relayed to the media element 36 (arrow 208). In this manner, a SIP-based communications session (not shown) may be established between the media element 36 and the SIP endpoint 18. The SIP endpoint WebRTC token 66 is also sent to the remote endpoint 50 (arrows 210 and 212). A WebRTC interactive session (not shown) may thus be effectively established between the SIP endpoint 18 and the remote endpoint 50 via the media element 36 based on the SIP endpoint WebRTC token 66 and the WebRTC initiation token 60.

As with FIG. 7, the sequence of communications flows for establishing the SIP-based communications session between the media element 36 and the SIP endpoint 18 described in FIG. 9 is one non-limiting example. Other embodiments within the scope of the present disclosure may employ a different sequence of communications flows to establish the SIP-based communications session. For example, the media redirection agent 14 may request and receive the media element SIP offer 196 from the SIP endpoint 18, send the SIP initiation request 200 to and receive the SIP answer message 204 from the media element 36, and send the SIP answer message 204 to the SIP endpoint 18.

Figure 10:
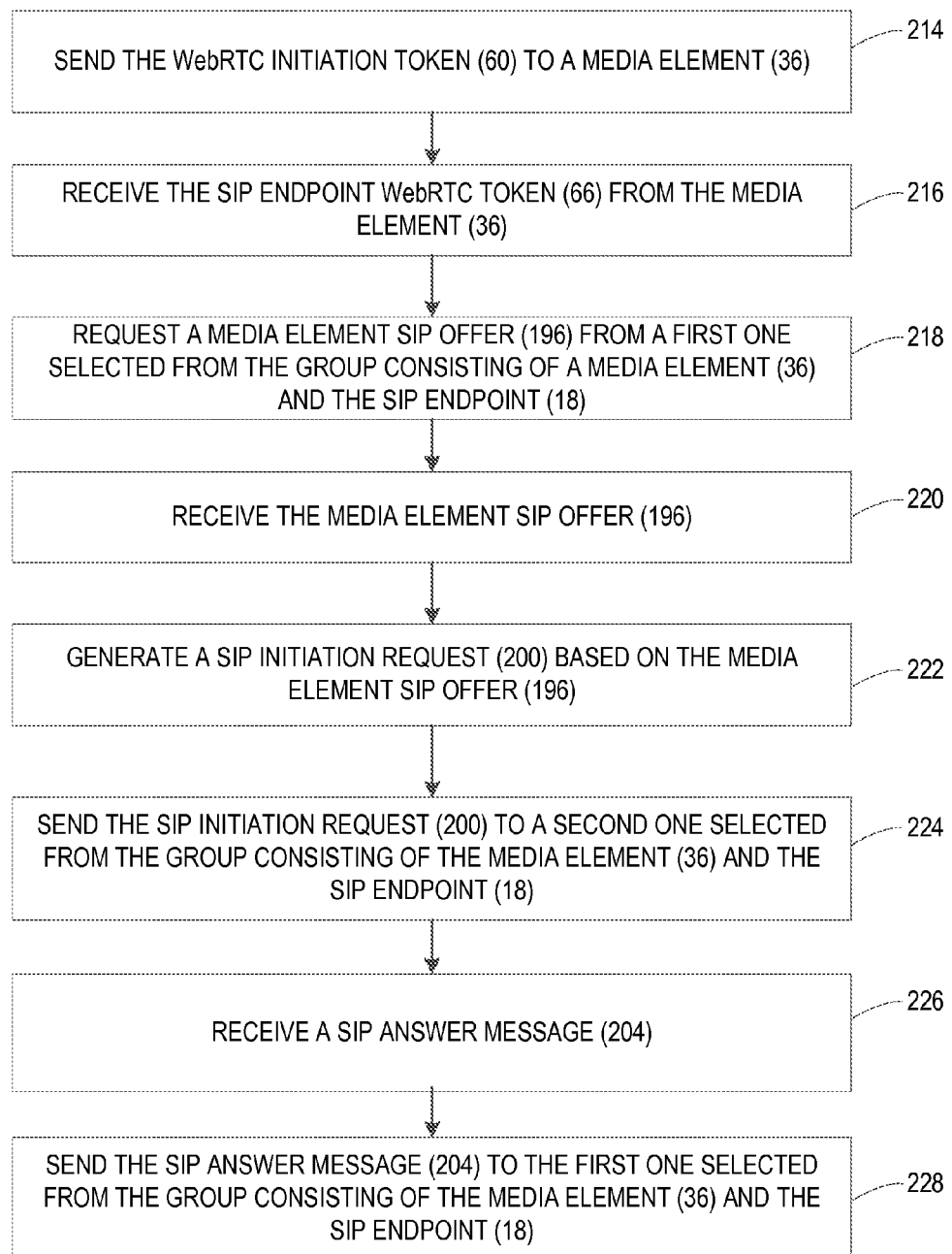
FIG. 10 is a flowchart illustrating further exemplary operations of the media redirection agent of FIG. 1 for establishing a communications connection for a remote endpoint-initiated WebRTC interactive session between a SIP endpoint and the remote endpoint using an intermediate media element.

Exemplary operations for providing the communications flows described in FIG. 9 for a remotely-initiated WebRTC interactive session between a SIP endpoint 18 and a remote endpoint 50 using an intermediate media element 36 are illustrated in FIG. 10. The operations illustrated by FIG. 10 correspond to operations of block 88 of FIG. 3 for generating the SIP endpoint WebRTC token 66. In FIG. 10, operations for generating the SIP endpoint WebRTC token 66 comprise sending the WebRTC initiation token 60 to the media element 36 (block 214). The media redirection agent 14 then receives the SIP endpoint WebRTC token 66 from the media element 36 (block 216). To establish a SIP-based communications session between the media element 36 and the SIP endpoint 18, the media redirection agent 14 requests a media element SIP offer 196 from a first one selected from the group consisting of a media element 36 and the SIP endpoint 18 (block 218). The media element SIP offer 196 will be used to establish a SIP-based communications session between the media element 36 and the SIP endpoint 18.

The media redirection agent 14 receives the media element SIP offer 196 (block 220). The media redirection agent 14 then generates a SIP initiation request 200 based on the media element SIP offer 196 (block 222). The SIP initiation request 200 is sent by the media redirection agent 14 to a second one selected from the group consisting of the media element 36 and the SIP endpoint 18 (block 224). The media redirection agent 14 next receives a SIP answer message 204 (block 226). The SIP answer message 204 is sent to the first of the media element 36 and the SIP endpoint 18 (block 228).

In some embodiments, it may be desirable for the audio and video streams received from the remote endpoint 50 during a WebRTC interactive session to be split between the SIP endpoint 18 and the WebRTC functionality provider 24 of the WebRTC client 12. For instance, some embodiments disclosed herein may use the SIP endpoint 18 to enhance an audio stream of a WebRTC interactive session, while the WebRTC functionality provider 24 of the WebRTC client 12 provides the video stream of the WebRTC interactive session. To accomplish this, the media redirection agent 14 may be configured to use the media element 36 to establish a SIP-based audio communications connection with the SIP endpoint 18, establish a WebRTC video flow with the WebRTC client 12, and "split" the incoming WebRTC audio and video flows from the remote endpoint 50 to redirect them to the SIP endpoint 18 and the WebRTC client 12, respectively.

Figure 11A:
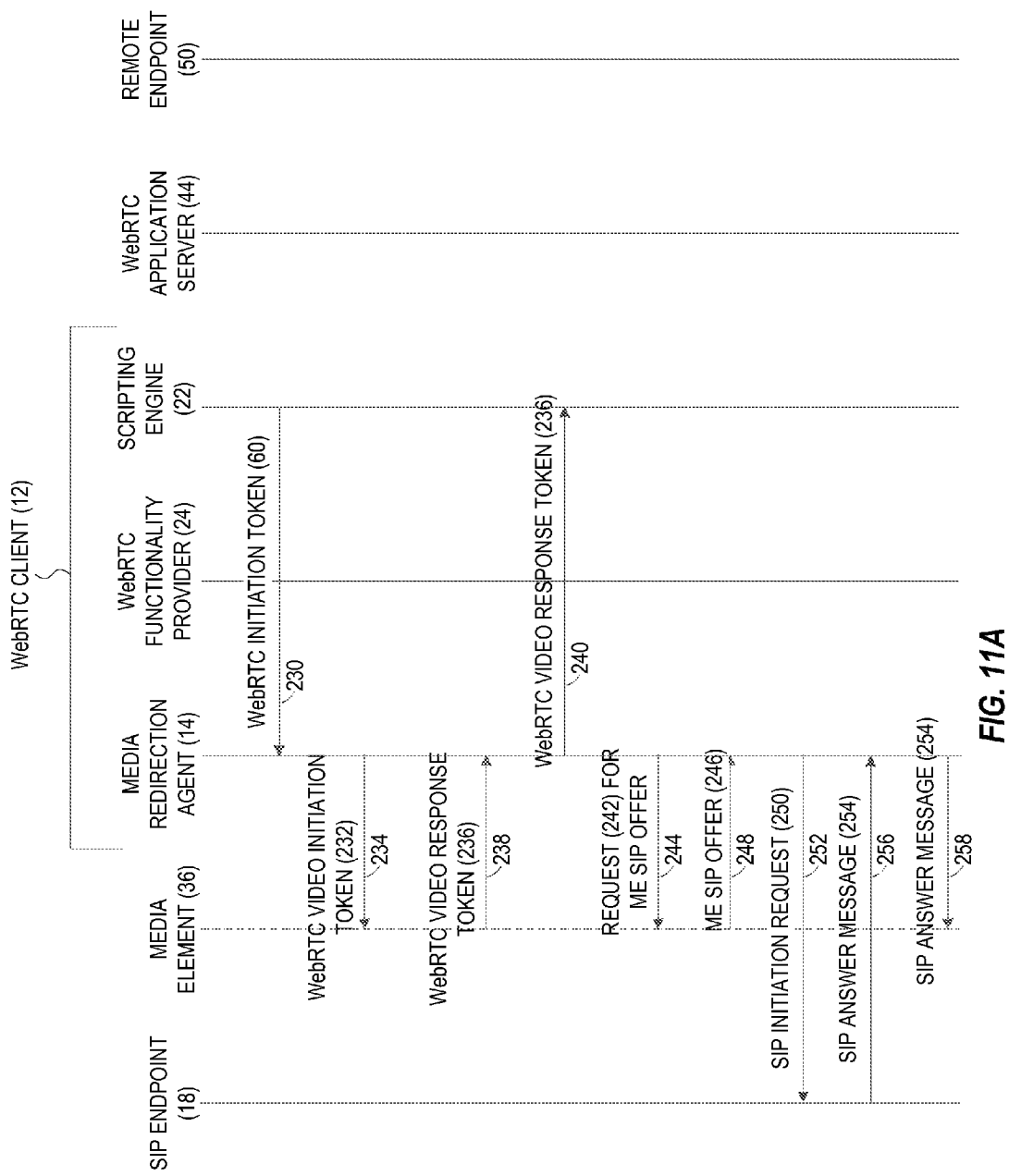
FIGS. 11A-11B are diagrams illustrating exemplary communications flows among elements of the WebRTC interactive system of FIG. 1 to provide separate handling of a video stream and an audio stream for a WebRTC client-initiated WebRTC interactive session.
Figure 11B:
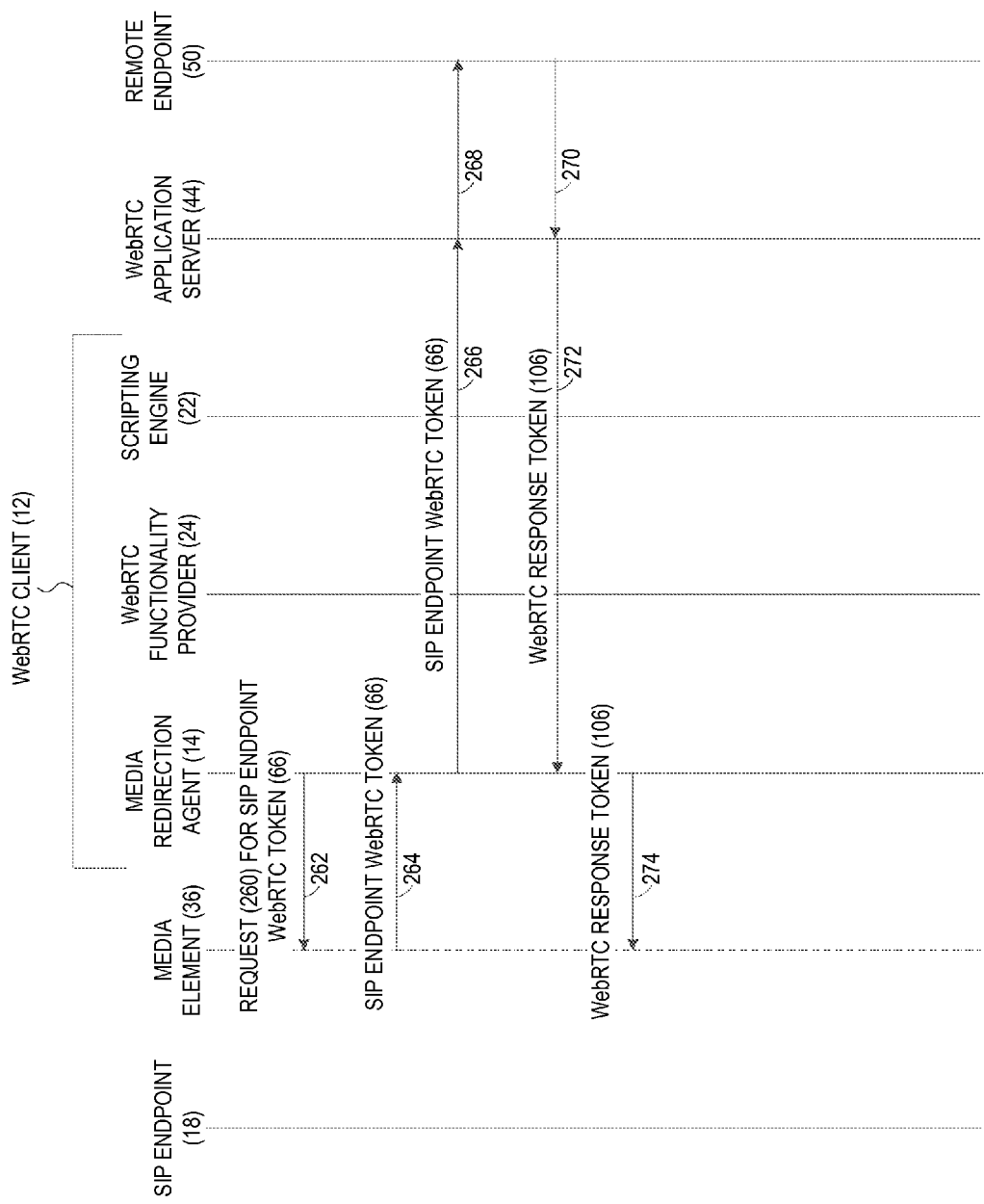
Figure 12A:
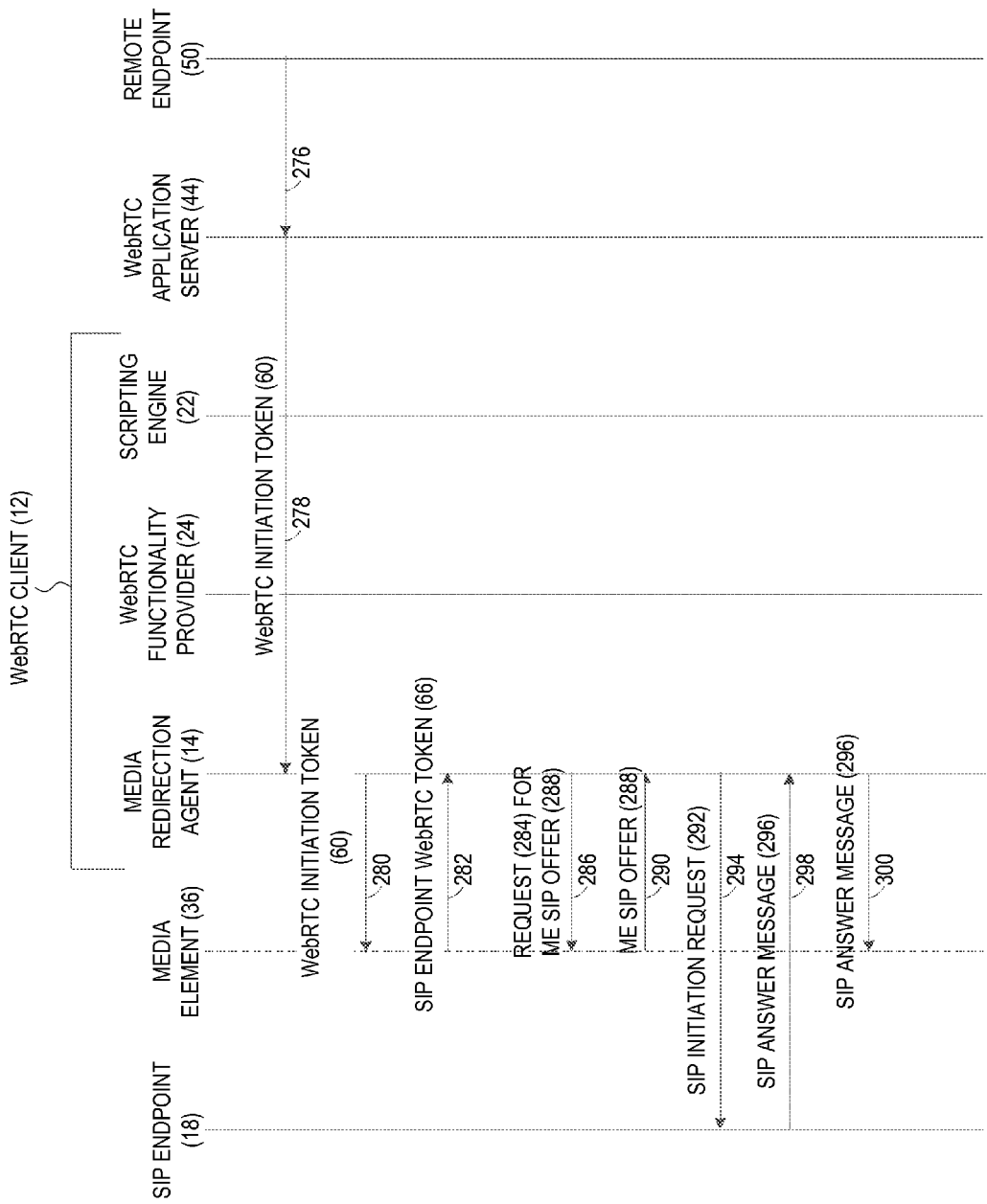
FIGS. 12A-12B are diagrams illustrating exemplary communications flows among elements of the WebRTC interactive system of FIG. 1 to provide separate handling of a video stream and an audio stream for a remote endpoint-initiated WebRTC interactive session.
Figure 12B:
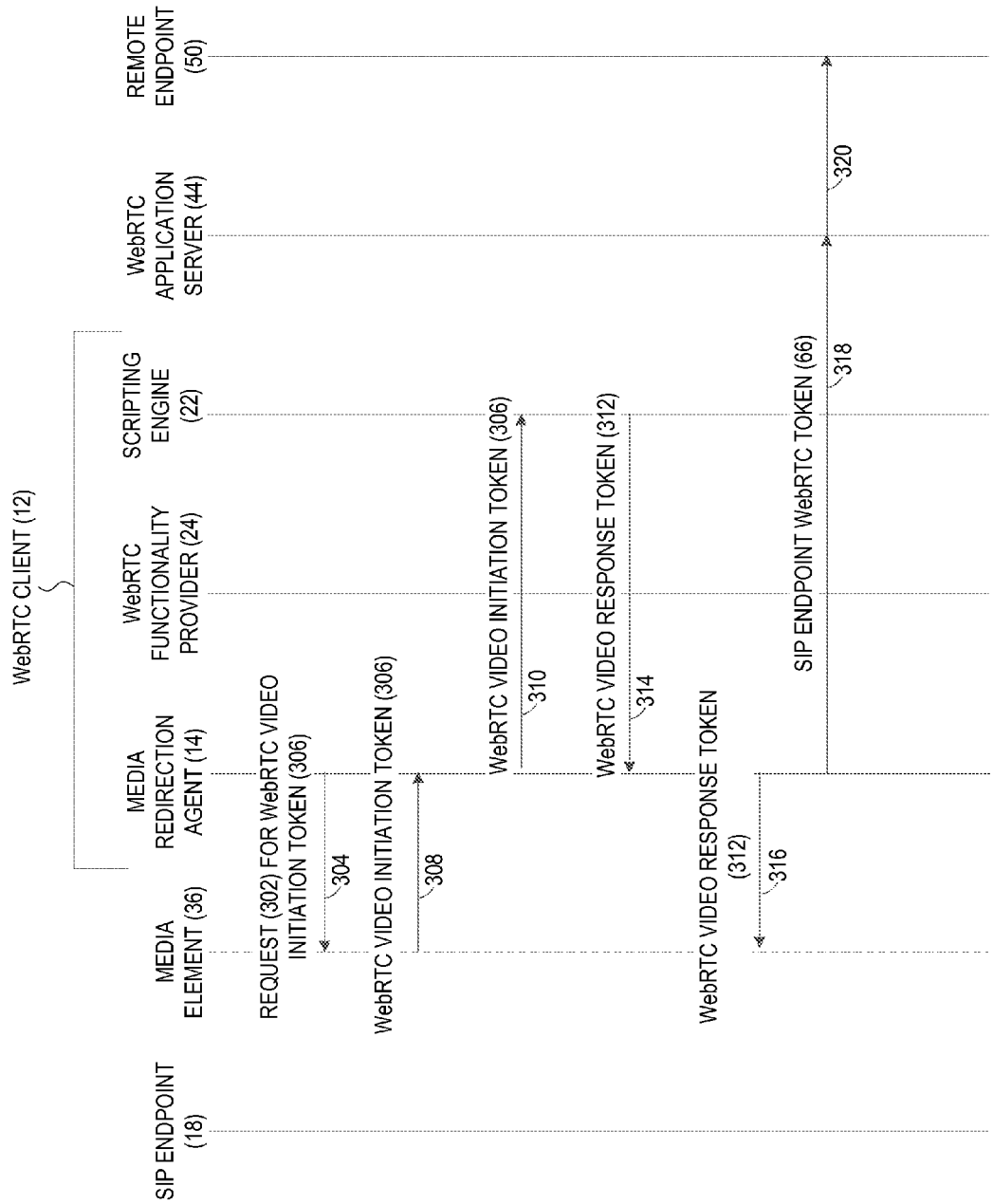
Figure 13:
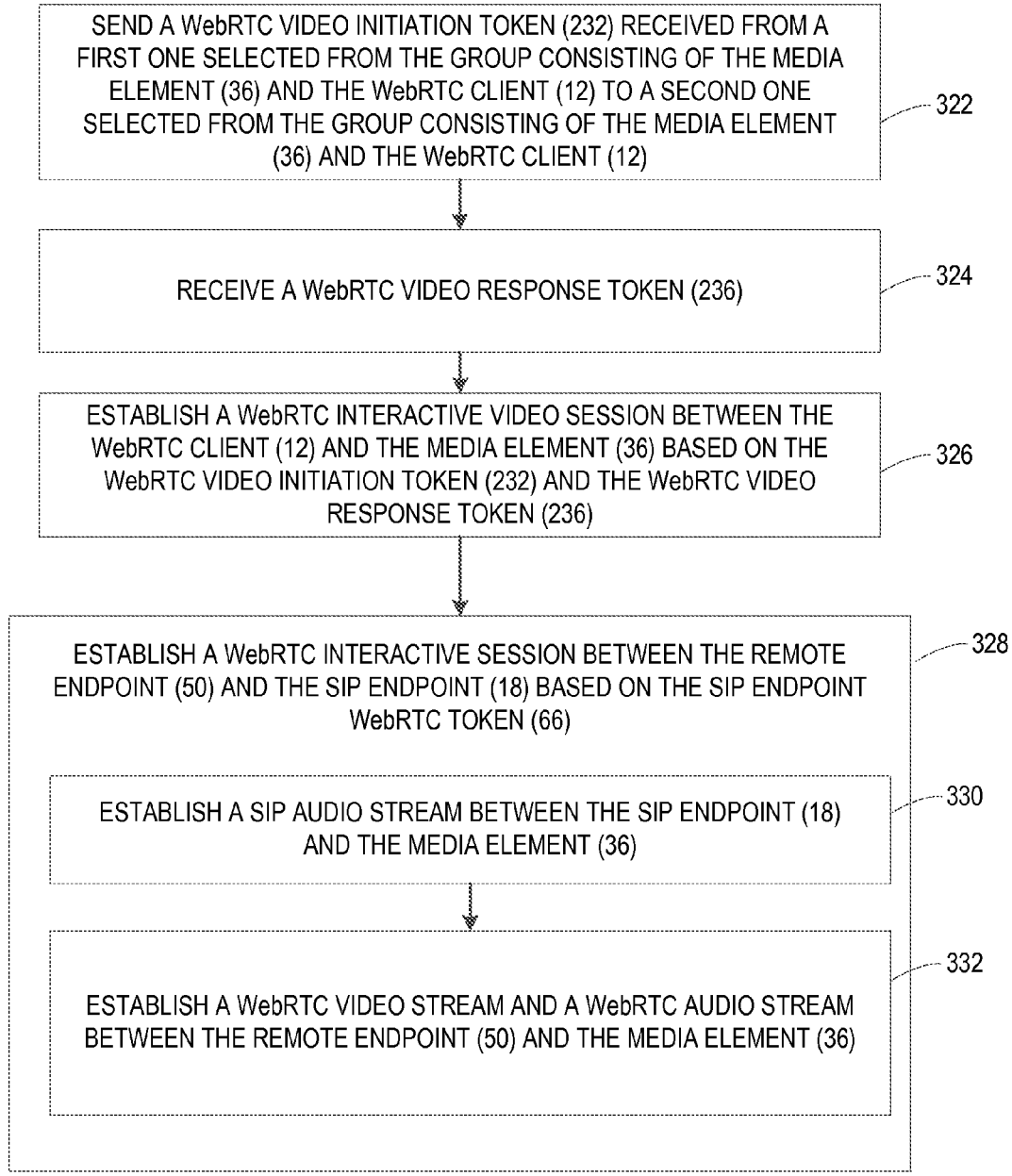
FIG. 13 is a flowchart illustrating further exemplary operations of the media redirection agent of FIG. 1 for employing a media element and a SIP endpoint to provide separate handling of a video stream and an audio stream of a WebRTC interactive session.
Figure 14A:
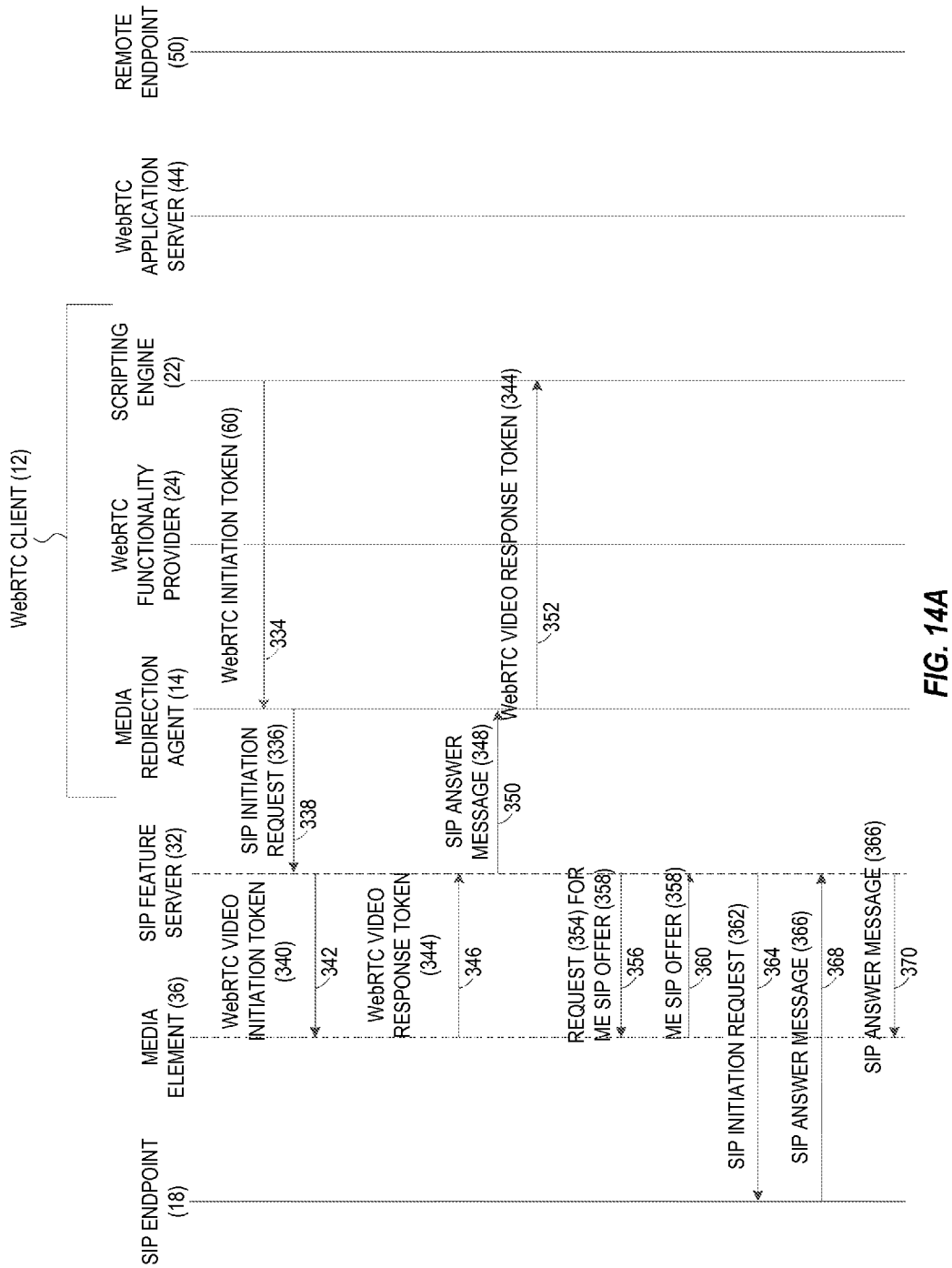
FIGS. 14A-14B are diagrams illustrating exemplary communications flows among elements of the WebRTC interactive system of FIG. 1 to provide enhanced media characteristics during a WebRTC interactive session facilitated by an intermediate SIP feature server.
Figure 14B:
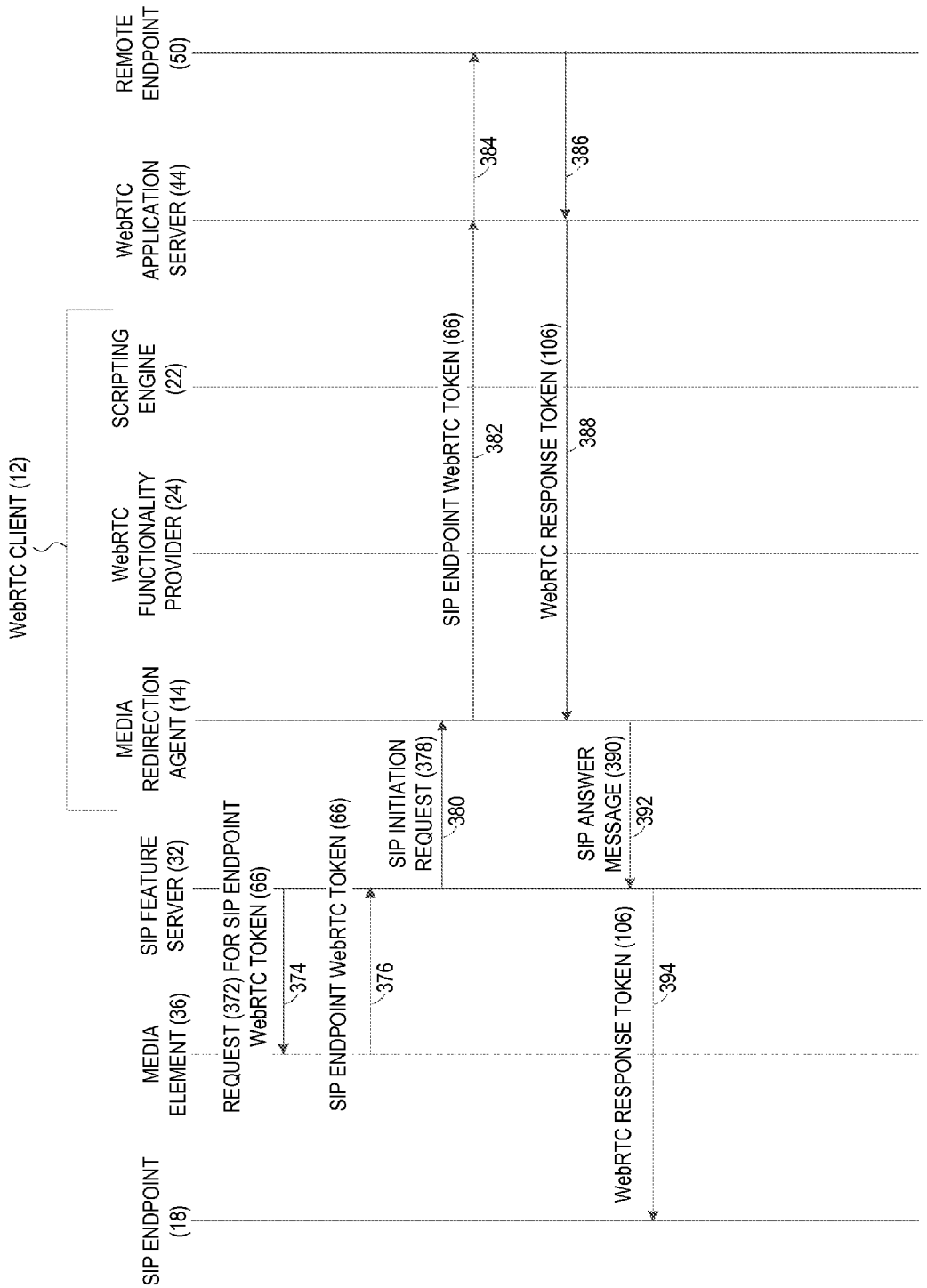

In this regard, FIGS. 11A-11B, 12A-12B, and 13 are provided. FIGS. 11A-11B illustrate communications flows for the media redirection agent 14 of FIG. 1 to provide split audio and video flows for a WebRTC interactive session initiated by the WebRTC client 12. Similarly, FIGS. 12A-12B illustrate communications flows for the media redirection agent 14 of FIG. 1 to provide split audio and video flows for a WebRTC interactive session that is initiated by the remote endpoint 50. FIG. 13 is a flowchart illustrating exemplary operations for enabling the communications flows discussed in FIGS. 11A-11B and FIGS. 12A-12B. As with the preceding communications flows diagrams, the SIP endpoint 18, the media element 36, the media redirection agent 14, the WebRTC functionality provider 24, the scripting engine 22, the WebRTC application server 44, and the remote endpoint 50 of FIG. 1 are each represented by a vertical line in FIGS. 11A-11B and FIGS. 12A-12B. The media redirection agent 14, the WebRTC functionality provider 24, and the scripting engine 22 together constitute the WebRTC client 12 of FIG. 1.

In FIG. 11A, the WebRTC initiation token 60 generated by the scripting engine 22 of the WebRTC client 12 is intercepted by the media redirection agent 14 (as indicated by arrow 230). The media redirection agent 14 then seeks to establish a WebRTC interactive video session between the media element 36 and the WebRTC client 12. The media redirection agent 14 sends a WebRTC video initiation token 232 (comprising the WebRTC initiation token 60) to the media element 36 (arrow 234), and receives a WebRTC video response token 236 in response (arrow 238). The WebRTC video initiation token 232 and the WebRTC video response token 236 may comprise, for example, a WebRTC offer and answer, respectively. The WebRTC video response token 236 is then sent to the scripting engine 22 of the WebRTC client 12 (arrow 240). A WebRTC interactive video session (not shown) may thus be established between the media element 36 and the WebRTC client 12.

With continued reference to FIG. 11A, communications flows similar to those illustrated in FIG. 7 then take place. The media redirection agent 14 in FIG. 11A sends a request 242 for a media element (ME) SIP offer 246 to the media element 36 (arrow 244). The media redirection agent 14 then receives the media element SIP offer 246 from the media element 36 (arrow 248). Using the media element SIP offer 246, the media redirection agent 14 generates and sends a SIP initiation request 250 (e.g., a SIP INVITE message) to the SIP endpoint 18 (arrow 252). The media redirection agent 14 then receives a SIP answer message 254 (e.g., a SIP OK message) from the SIP endpoint 18 (arrow 256). The SIP answer message 254 is then relayed to the media element 36 (arrow 258). In this manner, a SIP-based communications session (not shown) may be established between the media element 36 and the SIP endpoint 18.

It is to be understood that the sequence of communications flows for establishing a WebRTC interactive video session between the media element 36 and the WebRTC client 12 is one non-limiting example, and that other embodiments within the scope of the present disclosure may employ a different sequence of communications flows. For instance, the media redirection agent 14 may send the WebRTC video initiation token 232 to the WebRTC client 12, receive the WebRTC video response token 236 from the WebRTC client 12, and send the WebRTC video response token 236 to the media element 36. It is to be further understood that the sequence of communications flows for establishing the SIP-based communications session between the media element 36 and the SIP endpoint 18 described in FIG. 11A is one non-limiting example, and a different sequence of communications flows may be used in other embodiments. For example, the media redirection agent 14 may request and receive the media element SIP offer 138 from the SIP endpoint 18, send the SIP initiation request 142 to and receive the SIP answer message 146 from the media element 36, and send the SIP answer message 146 to the SIP endpoint 18.

Referring now to FIG. 11B, the media redirection agent 14 next sends a request 260 for the SIP endpoint WebRTC token 66 to the media element 36 (arrow 262). The media element 36 provides the SIP endpoint WebRTC token 66 to the media redirection agent 14 in response to the request 260 (arrow 264). The media redirection agent 14 then sends the SIP endpoint WebRTC token 66 to the remote endpoint 50 via the WebRTC application server 44 as a WebRTC offer (arrows 266 and 268). If a user of the remote endpoint 50 wishes to participate in a WebRTC interactive session, the remote endpoint 50 returns a WebRTC response token 106 to the media redirection agent 14 via the WebRTC application server 44 (arrows 270 and 272). The media redirection agent 14 then forwards the WebRTC response token 106 to the media element 36 (arrow 274).

FIGS. 12A and 12B illustrate communications flows for providing separate handling of a WebRTC audio stream and a WebRTC video stream for a remote endpoint-initiated WebRTC interactive session. In FIG. 12A, the WebRTC initiation token 60 is received from the remote endpoint 50 via the WebRTC application server 44 (e.g., as a WebRTC offer), and is intercepted by the media redirection agent 14 (as indicated by arrows 276 and 278). The media redirection agent 14 sends the WebRTC initiation token 60 to the media element 36 (arrow 280), and receives the SIP endpoint WebRTC token 66 from the media element 36 in response (arrow 282).

The media redirection agent 14 in FIG. 12A next sends a request 284 for a media element (ME) SIP offer 288 to the media element 36 (arrow 286), and receives the media element SIP offer 288 from the media element 36 (arrow 290). Using the media element SIP offer 288, the media redirection agent 14 generates and sends a SIP initiation request 292 (e.g., a SIP INVITE message) to the SIP endpoint 18 (arrow 294). The media redirection agent 14 may then receive a SIP answer message 296 (e.g., a SIP OK message) from the SIP endpoint 18 (arrow 298). The SIP answer message 296 is then relayed to the media element 36 (arrow 300). In this manner, a SIP-based communications session (not shown) may be established between the media element 36 and the SIP endpoint 18.

Referring now to FIG. 12B, the media redirection agent 14 then seeks to establish a WebRTC interactive video session between the media element 36 and the WebRTC client 12. The media redirection agent 14 sends a request 302 for a WebRTC video initiation token 306 to the media element 36 (as indicated by arrow 304), and receives the WebRTC video initiation token 306 in response (arrow 308). The media redirection agent 14 then sends the WebRTC video initiation token 306 received from the media element 36 to the scripting engine 22 of the WebRTC client 12 (arrow 310). The media redirection agent 14 receives a WebRTC video response token 312 from the scripting engine 22 (arrow 314). The WebRTC video initiation token 306 and the WebRTC video response token 312 may comprise, for example, a WebRTC offer and answer, respectively. The WebRTC video response token 312 is then sent to the media element 36 (arrow 316). A WebRTC interactive video session (not shown) may thus be established between the media element 36 and the WebRTC client 12. The SIP endpoint WebRTC token 66 is also sent to the remote endpoint 50 (arrows 318 and 320) to establish a WebRTC interactive session with the remote endpoint 50.

The sequence of communications flows for establishing a WebRTC interactive video session between the media element 36 and the WebRTC client 12 shown in FIGS. 12A and 12B is one non-limiting example, and other embodiments within the scope of the present disclosure may employ a different sequence of communications flows. For instance, the media redirection agent 14 may request the WebRTC video initiation token 306 from the WebRTC client 12, receive the WebRTC video initiation token 306 from the WebRTC client 12, send the WebRTC video initiation token 306 to the media element 36, receive the WebRTC video response token 312 from the media element 36, and send the WebRTC video response token 312 to the WebRTC client 12. It is to be further understood that the sequence of communications flows for establishing the SIP-based communications session between the media element 36 and the SIP endpoint 18 described in FIG. 12A is one non-limiting example, and a different sequence of communications flows may be used in other embodiments. For example, the media redirection agent 14 may request and receive the media element SIP offer 288 from the SIP endpoint 18, send the SIP initiation request 292 to and receive the SIP answer message 296 from the media element 36, and send the SIP answer message 296 to the SIP endpoint 18.

FIG. 13 is a flowchart illustrating further exemplary operations of the media redirection agent 14 of FIG. 1 for employing a media element 36 and a SIP endpoint 18 to provide separate handling of a video stream and an audio stream of a WebRTC interactive session. In embodiments illustrated in FIGS. 11A and 11B, the operations of FIG. 13 may take place prior to generating the SIP endpoint WebRTC token 66. In embodiments illustrated in FIGS. 12A and 12B, the operations of FIG. 13 may take place after generating the SIP endpoint WebRTC token 66.

In FIG. 13, operations begin with the media redirection agent 14 sending a WebRTC video initiation token 232 received from a first one selected from the group consisting of the media element 36 and the WebRTC client 12 to a second one selected from the group consisting of the media element 36 and the WebRTC client 12 (block 322). The media redirection agent 14 next receives a WebRTC video response token 236 (block 324). A WebRTC interactive video session is established between the WebRTC client 12 and the media element 36 based on the WebRTC video initiation token 232 and the WebRTC video response token 236 (block 326).

The media redirection agent 14 then carries out operations to establish a WebRTC interactive session between the remote endpoint 50 and the SIP endpoint 18 based on the SIP endpoint WebRTC token 66 (block 328). As seen in FIG. 13, operations for establishing the WebRTC interactive session include establishing a SIP audio stream between the SIP endpoint 18 and the media element 36 (block 330). A WebRTC video stream and a WebRTC audio stream are established between the remote endpoint 50 and the media element 36 (block 332).

In some embodiments, communications between the media redirection agent 14 and the media element 36 may be facilitated by a SIP feature server 32. In this regard, FIGS. 14A and 14B are provided to illustrate exemplary communications flows among elements of the WebRTC interactive system 10 of FIG. 1 to provide enhanced media characteristics during a WebRTC interactive session facilitated by the SIP feature server 32. For the sake of clarity, elements of FIGS. 1 and 2 are referenced in describing FIGS. 14A and 14B. Similar to the communications flows diagrams discussed above, the SIP endpoint 18, the media element 36, the SIP feature server 32, the media redirection agent 14, the WebRTC functionality provider 24, the scripting engine 22, the WebRTC application server 44, and the remote endpoint 50 of FIG. 1 are each represented by a vertical line in FIGS. 14A and 14B. The media redirection agent 14, the WebRTC functionality provider 24, and the scripting engine 22 together constitute the WebRTC client 12 of FIG. 1.

In the example of FIGS. 14A and 14B, the WebRTC initiation token 60 is generated by the scripting engine 22 of the WebRTC client 12. It is to be understood that similar communications flows may result in embodiments where the WebRTC initiation token 60 is received from the remote endpoint 50. As seen in FIG. 14A, the WebRTC initiation token 60 is intercepted by the media redirection agent 14 (as indicated by arrow 334). The media redirection agent 14 then seeks to establish a WebRTC interactive video session between the media element 36 and the WebRTC client 12 by communicating through the SIP feature server 32. Thus, the media redirection agent 14 sends a SIP initiation request 336 (comprising the WebRTC initiation token 60) to the SIP feature server 32 (arrow 338). The SIP feature server 32 sends a WebRTC video initiation token 340 (comprising the WebRTC initiation token 60) to the media element 36 (arrow 342), and receives a WebRTC video response token 344 in response (arrow 346). The WebRTC video initiation token 340 and the WebRTC video response token 344 may comprise, for example, a WebRTC offer and answer, respectively. The SIP feature server 32 relays the WebRTC video response token 344 to the media redirection agent 14 as a SIP answer message 348 (arrow 350). The WebRTC video response token 344 is then sent to the scripting engine 22 of the WebRTC client 12 (arrow 352). A WebRTC interactive video session (not shown) may thus be established between the media element 36 and the WebRTC client 12.

With continued reference to FIG. 14A, the SIP feature server 32 sends a request 354 for a media element (ME) SIP offer 358 to the media element 36 (arrow 356). The SIP feature server 32 then receives the media element SIP offer 358 from the media element 36 (arrow 360). Using the media element SIP offer 358, the SIP feature server 32 generates and sends a SIP initiation request 362 (e.g., a SIP INVITE message) to the SIP endpoint 18 (arrow 364). The SIP feature server 32 then receives a SIP answer message 366 (e.g., a SIP OK message) from the SIP endpoint 18 (arrow 368). The SIP answer message 366 is then relayed to the media element 36 (arrow 370). In this manner, a SIP-based communications session (not shown) may be established between the media element 36 and the SIP endpoint 18.

Referring now to FIG. 14B, the SIP feature server 32 next sends a request 372 for the SIP endpoint WebRTC token 66 to the media element 36 (as indicated by arrow 374). The media element 36 provides the SIP endpoint WebRTC token 66 to the SIP feature server 32 in response to the request 372 (arrow 376). The SIP feature server 32 then sends the SIP endpoint WebRTC token 66 to the media redirection agent 14 as part of a SIP initiation request 378 (arrow 380). The media redirection agent 14 sends the SIP endpoint WebRTC token 66 to the remote endpoint 50 via the WebRTC application server 44 as a WebRTC offer (arrows 382 and 384). If a user of the remote endpoint 50 wishes to participate in a WebRTC interactive session, the remote endpoint 50 returns a WebRTC response token 106 to the media redirection agent 14 via the WebRTC application server 44 (arrows 386 and 388). The media redirection agent 14 then forwards the WebRTC response token 106 to the SIP feature server 32 as a SIP answer message 390 (arrow 392). The SIP feature server 32 sends the WebRTC response token 106 to the media element 36 (arrow 394).

Figure 15:
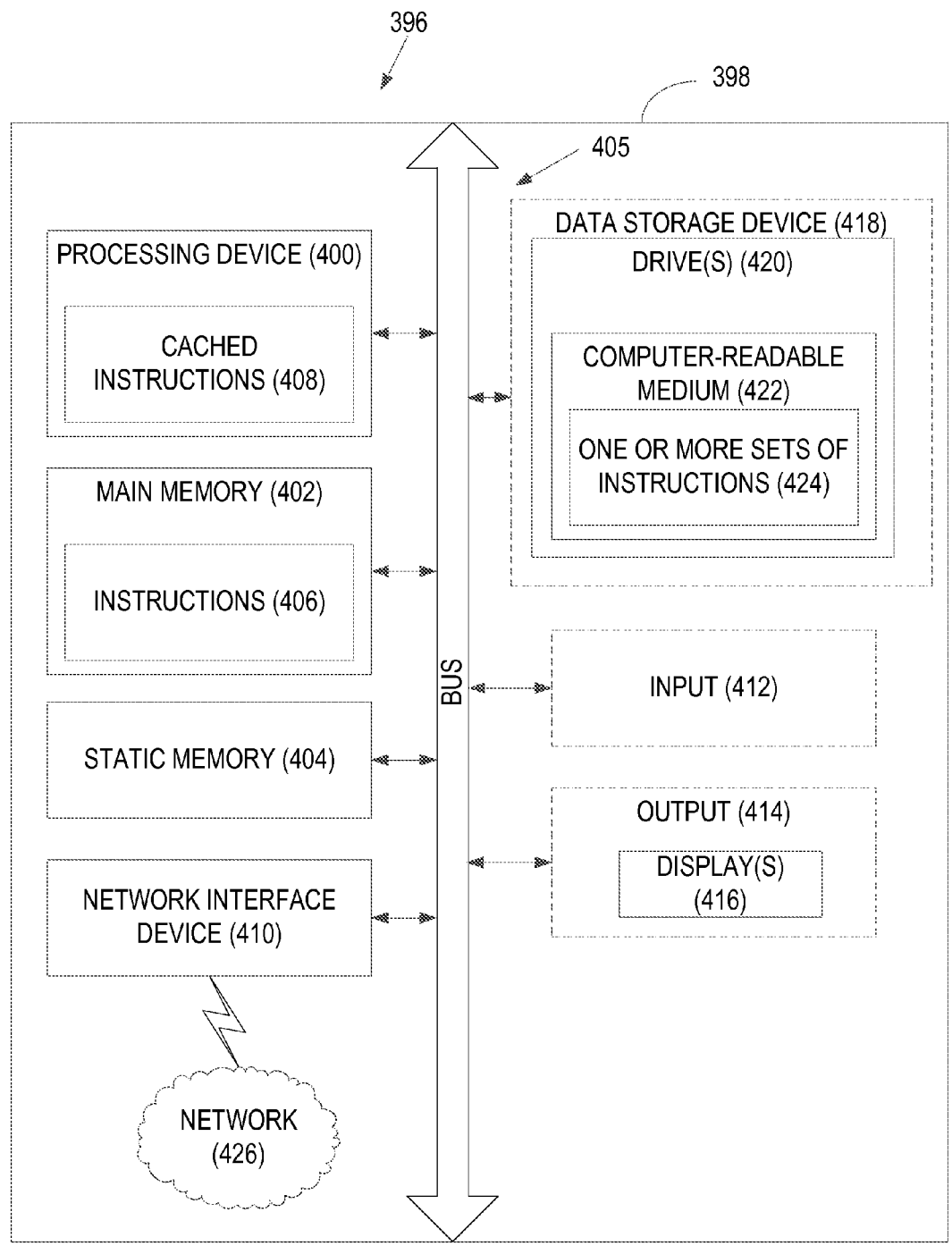
FIG. 15 is a block diagram of an exemplary processor-based system that may include the media redirection agent of FIG. 1.

FIG. 15 provides a block diagram representation of a processing system 396 in the exemplary form of an exemplary computer system 398 adapted to execute instructions to perform the functions described herein. In some embodiments, the processing system 396 may execute instructions to perform the functions of the media redirection agent 14 of FIG. 1. In this regard, the processing system 396 may comprise the computer system 398, within which a set of instructions for causing the processing system 396 to perform any one or more of the methodologies discussed herein may be executed. The processing system 396 may be connected (as a non-limiting example, networked) to other machines in a local area network (LAN), an intranet, an extranet, or the Internet. The processing system 396 may operate in a client-server network environment, or as a peer machine in a peer-to-peer (or distributed) network environment. While only a single processing system 396 is illustrated, the terms "controller" and "server" shall also be taken to include any collection of machines that individually or jointly execute a set (or multiple sets) of instructions to perform any one or more of the methodologies discussed herein. The processing system 396 may be a server, a personal computer, a desktop computer, a laptop computer, a personal digital assistant (PDA), a computing pad, a mobile device, or any other device and may represent, as non-limiting examples, a server or a user's computer.

The exemplary computer system 398 includes a processing device or processor 400, a main memory 402 (as non-limiting examples, read-only memory (ROM), flash memory, dynamic random access memory (DRAM) such as synchronous DRAM (SDRAM), etc.), and a static memory 404 (as non-limiting examples, flash memory, static random access memory (SRAM), etc.), which may communicate with each other via a bus 405. Alternatively, the processing device 400 may be connected to the main memory 402 and/or the static memory 404 directly or via some other connectivity means.

The processing device 400 represents one or more processing devices such as a microprocessor, central processing unit (CPU), or the like. More particularly, the processing device 400 may be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing device 400 is configured to execute processing logic in instructions 406 and/or cached instructions 408 for performing the operations and steps discussed herein.

The computer system 398 may further include a communications interface in the form of a network interface device 410. It also may or may not include an input 412 to receive input and selections to be communicated to the computer system 398 when executing the instructions 406, 408. It also may or may not include an output 414, including but not limited to display(s) 416. The display(s) 416 may be a video display unit (as non-limiting examples, a liquid crystal display (LCD) or a cathode ray tube (CRT)), an alphanumeric input device (as a non-limiting example, a keyboard), a cursor control device (as a non-limiting example, a mouse), and/or a touch screen device (as a non-limiting example, a tablet input device or screen).

The computer system 398 may or may not include a data storage device 418 that includes using drive(s) 420 to store the functions described herein in a computer-readable medium 422, on which is stored one or more sets of instructions 424 (e.g., software) embodying any one or more of the methodologies or functions described herein. The functions can include the methods and/or other functions of the processing system 396, a participant user device, and/or a licensing server, as non-limiting examples. The one or more sets of instructions 424 may also reside, completely or at least partially, within the main memory 402 and/or within the processing device 400 during execution thereof by the computer system 398. The main memory 402 and the processing device 400 also constitute machine-accessible storage media. The instructions 406, 408, and/or 424 may further be transmitted or received over a network 426 via the network interface device 410. The network 426 may be an intra-network or an inter-network.

While the computer-readable medium 422 is shown in an exemplary embodiment to be a single medium, the term "machine-accessible storage medium" should be taken to include a single medium or multiple media (as non-limiting examples, a centralized or distributed database, and/or associated caches and servers) that store the one or more sets of instructions 424. The term "machine-accessible storage medium" shall also be taken to include any medium that is capable of storing, encoding, or carrying a set of instructions for execution by the machine, and that cause the machine to perform any one or more of the methodologies disclosed herein. The term "machine-accessible storage medium" shall accordingly be taken to include, but not be limited to, solid-state memories, optical and magnetic media, and carrier wave signals.

The embodiments disclosed herein may be embodied in hardware and in instructions that are stored in hardware, and may reside, as non-limiting examples, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC). The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. It is to be understood that the operational steps illustrated in the flow chart diagrams may be subject to numerous different modifications as will be readily apparent to one of skill in the art. Those of skill in the art would also understand that information and signals may be represented using any of a variety of different technologies and techniques. As non-limiting examples, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A method for enhancing media characteristics during Web Real-Time Communications (WebRTC) interactive sessions by using Session initiation Protocol (SIP) endpoints, comprising:
   intercepting, by a media redirection agent of a WebRTC client executing on a computing device, a WebRTC initiation token exchanged during a WebRTC initiation dialog between the WebRTC client and a remote device;
   generating, by the media redirection agent, a SIP endpoint WebRTC token based on the WebRTC initiation token;
   sending, by the media redirection agent, the SIP endpoint WebRTC token to the remote endpoint;
   establishing, by the WebRTC client, a WebRTC interactive session between the WebRTC client and the remote endpoint; and
   establishing, by the WebRTC client, a WebRTC interactive session between the remote endpoint and a SIP endpoint based on the SIP endpoint WebRTC token, wherein the SIP endpoint comprises telephony or teleconferencing equipment separate from the computing device executing the WebRTC client and wherein the SIP endpoint provides at least one of an audio portion or a video portion of the WebRTC interactive session between the WebRTC client and the remote endpoint via the WebRTC interactive session between the remote endpoint and the SIP endpoint.

2. The method of claim 1, wherein generating the SIP endpoint WebRTC token based on the WebRTC initiation token comprises:
   requesting the SIP endpoint WebRTC token from the SIP endpoint based on the WebRTC initiation token; and
   receiving the SIP endpoint WebRTC token from the SIP endpoint.

3. The method of claim 1, wherein:
   the WebRTC initiation token is generated by the WebRTC client; and
   generating the SIP endpoint WebRTC token based on the WebRTC initiation token comprises:
      requesting a media element SIP offer from a first one selected from the group consisting of a media element and the SIP endpoint;
      receiving the media element SIP offer;
      generating a SIP initiation request based on the media element SIP offer;
      sending the SIP initiation request to a second one selected from the group consisting of the media element and the SIP endpoint;
      receiving a SIP answer message;
      sending the SIP answer message to the first one selected from the group consisting of the media element and the SIP endpoint;
      requesting the SIP endpoint WebRTC token based on the WebRTC initiation token from the media element; and
      receiving the SIP endpoint WebRTC token from the media element.

4. The method of claim 3, further comprising, prior to generating the SIP endpoint WebRTC token based on the WebRTC initiation token:
   sending a WebRTC video initiation token received from a first one selected from the group consisting of the media element and the WebRTC client to a second one selected from the group consisting of the media element and the WebRTC client;
   receiving a WebRTC video response token; and
   establishing a WebRTC interactive video session between the WebRTC client and the media element based on the WebRTC video initiation token and the WebRTC video response token;
   wherein establishing the WebRTC interactive session between the remote endpoint and the SIP endpoint based on the SIP endpoint WebRTC token comprises:
      establishing a WebRTC audio stream between the SIP endpoint and the media element; and
      establishing a WebRTC video stream and the WebRTC audio stream between the remote endpoint and the media element.

5. The method of claim 1, wherein:
   the WebRTC initiation token is generated by the remote endpoint; and
   generating the SIP endpoint WebRTC token based on the WebRTC initiation token comprises:
      sending the WebRTC initiation token to a media element;
      receiving the SIP endpoint WebRTC token from the media element;
      requesting a media element SIP offer from a first one selected from the group consisting of the media element and the SIP endpoint;
      receiving the media element SIP offer;
      generating a SIP initiation request based on the media element SIP offer;
      sending the SIP initiation request to a second one selected from the group consisting of the media element and the SIP endpoint;
      receiving a SIP answer message; and
      sending the SIP answer message to the first one selected from the group consisting of the media element and the SIP endpoint.

6. The method of claim 5, further comprising, after generating the SIP endpoint WebRTC token based on the WebRTC initiation token:
   sending a WebRTC video initiation token received from a first one selected from the group consisting of the media element and the WebRTC client to a second one selected from the group consisting of the media element and the WebRTC client;
   receiving a WebRTC video response token; and establishing a WebRTC interactive video session between the WebRTC client and the media element based on the WebRTC video initiation token and the WebRTC video response token;

wherein establishing the WebRTC interactive session between the remote endpoint and the SIP endpoint based on the SIP endpoint WebRTC token comprises:

establishing a first WebRTC audio stream between the SIP endpoint and the media element; and establishing a WebRTC video stream and a second WebRTC audio stream between the remote endpoint and the media element.

7. The method of claim 1, wherein generating the SIP endpoint WebRTC token is facilitated by a SIP feature server.

8. A system for enhancing media characteristics during Web Real-Time Communications (WebRTC) interactive sessions by using Session Initiation Protocol (SIP) endpoints, comprising:

at least one communications interface;

a SIP endpoint comprising telephony or teleconferencing equipment; and a first computing device communicatively coupled to the SIP endpoint via the at least one communications interface and executing a WebRTC client, the WebRTC client comprising a media redirection agent and wherein the SIP endpoint is separate from the first computing device;

the media redirection agent programmed to:

intercept a WebRTC initiation token exchanged during a WebRTC initiation dialog between the WebRTC client and a remote device;

generate a SIP endpoint WebRTC token based on the WebRTC initiation token;

send the SIP endpoint WebRTC token to the remote endpoint;

establish a WebRTC interactive session between the WebRTC client and the remote endpoint; and establish a WebRTC interactive session between the remote endpoint and the SIP endpoint based on the SIP endpoint WebRTC token, wherein the SIP endpoint provides at least one of an audio portion or a video portion of the WebRTC interactive session between the WebRTC client and the remote endpoint via the WebRTC interactive session between the remote endpoint and the SIP endpoint.

9. The system of claim 8, wherein the media redirection agent is configured to generate the SIP endpoint WebRTC token by:

requesting the SIP endpoint WebRTC token from the SIP endpoint based on the WebRTC initiation token; and receiving the SIP endpoint WebRTC token from the SIP endpoint.

10. The system of claim 8, further comprising a media element;

wherein:

the WebRTC client is configured to generate the WebRTC initiation token; and the media redirection agent is configured to generate the SIP endpoint WebRTC token by:

requesting a media element SIP offer from a first one selected from the group consisting of the media element and the SIP endpoint;

receiving the media element SIP offer;

generating a SIP initiation request based on the media element SIP offer;

sending the SIP initiation request to a second one selected from the group consisting of the media element and the SIP endpoint;

receiving a SIP answer message;

sending the SIP answer message to the first one selected from the group consisting of the media element and the SIP endpoint;

requesting the SIP endpoint WebRTC token based on the WebRTC initiation token from the media element; and receiving the SIP endpoint WebRTC token from the media element.

11. The system of claim 10; wherein the media redirection agent is further configured to, prior to generating the SIP endpoint WebRTC token based on the WebRTC initiation token:

send a WebRTC video initiation token received from a first one selected from the group consisting of the media element and the WebRTC client to a second one selected from the group consisting of the media element and the WebRTC client;

receive a WebRTC video response token; and establish a WebRTC interactive video session between the WebRTC client and the media element based on the WebRTC video initiation token and the WebRTC video response token;

wherein the media redirection agent is configured to establish the WebRTC interactive session between the remote endpoint and the SIP endpoint based on the SIP endpoint WebRTC token by:

establishing a first WebRTC audio stream between the SIP endpoint and the media element; and establishing a WebRTC video stream and a second WebRTC audio stream between the remote endpoint and the media element.

12. The system of claim 8, further comprising a media element;

wherein:

the WebRTC client is configured to receive the WebRTC initiation token from the remote endpoint; and the media redirection agent is configured to generate the SIP endpoint WebRTC token by:

sending the WebRTC initiation token to the media element;

receiving the SIP endpoint WebRTC token from the media element;

requesting a media element SIP offer from a first one selected from the group consisting of the media element and the SIP endpoint;

receiving the media element SIP offer;

generating a SIP initiation request based on the media element SIP offer;

sending the SIP initiation request to a second one selected from the group consisting of the media element and the SIP endpoint;

receiving a SIP answer message; and sending the SIP answer message to the first one selected from the group consisting of the media element and the SIP endpoint.

13. The system of claim 12, wherein the media redirection agent is further configured to, after generating the SIP endpoint WebRTC token based on the WebRTC initiation token:

send a WebRTC video initiation token received from a first one selected from the group consisting of the media element and the WebRTC client to a second one selected from the group consisting of the media element and the WebRTC client;
receive a WebRTC video response token; and
establish a WebRTC interactive video session between the WebRTC client and the media element based on the WebRTC video initiation token and the WebRTC video response token;
wherein the media redirection agent is configured to establish the WebRTC interactive session between the remote endpoint and the SIP endpoint based on the SIP endpoint WebRTC token by:
establishing a first WebRTC audio stream between the SIP endpoint and the media element; and
establishing a WebRTC video stream and a second WebRTC audio stream between the remote endpoint and the media element.

14. The system of claim 8, further comprising a SIP feature server configured to facilitate the media redirection agent in establishing the WebRTC interactive session between the remote endpoint and the SIP endpoint based on the SIP endpoint WebRTC token.

15. A non-transitory computer-readable medium having stored thereon computer-executable instructions to cause a processor to:
intercept, by a media redirection agent of a Web Real-Time Communications (WebRTC) client executing on a computing device, a WebRTC initiation token exchanged during a WebRTC initiation dialog between the WebRTC client and a remote device;
generate, by the media redirection agent, a Session Initiation Protocol (SIP) endpoint WebRTC token based on the WebRTC initiation token;
send, by the media redirection agent, the SIP endpoint WebRTC token to the remote endpoint;
establish, by the media redirection agent, a WebRTC interactive session between the WebRTC client and the remote endpoint; and
establish, by the media redirection agent, a WebRTC interactive session between the remote endpoint and a SIP endpoint based on the SIP endpoint WebRTC token, wherein the SIP endpoint comprises telephony or teleconferencing equipment separate from the computing device executing the WebRTC client and wherein the SIP endpoint provides at least one of an audio portion or a video portion of the WebRTC interactive session between the WebRTC client and the remote endpoint.

16. The non-transitory computer-readable medium of claim 15 having stored thereon the computer-executable instructions to cause the processor to generate the SIP endpoint WebRTC token based on the WebRTC initiation token by:
requesting the SIP endpoint WebRTC token from the SIP endpoint based on the WebRTC initiation token; and
receiving the SIP endpoint WebRTC token from the SIP endpoint.

17. The non-transitory computer-readable medium of claim 15 having stored thereon the computer-executable instructions to cause the processor to:
intercept the WebRTC initiation token by intercepting the WebRTC initiation token generated by the WebRTC client; and
generate the SIP endpoint WebRTC token based on the WebRTC initiation token by:
requesting a media element SIP offer from a first one selected from the group consisting of a media element and the SIP endpoint;
receiving the media element SIP offer;
generating a SIP initiation request based on the media element SIP offer;
sending the SIP initiation request to a second one selected from the group consisting of the media element and the SIP endpoint;
receiving a SIP answer message;
sending the SIP answer message to the first one selected from the group consisting of the media element and the SIP endpoint;
requesting the SIP endpoint WebRTC token based on the WebRTC initiation token from the media element; and
receiving the SIP endpoint WebRTC token from the media element.

18. The non-transitory computer-readable medium of claim 17 having stored thereon the computer-executable instructions to cause the processor to:
prior to generating the SIP endpoint WebRTC, token based on the WebRTC initiation token:
send a WebRTC video initiation token received from a first one selected from the group consisting of the media element and the WebRTC client to a second one selected from the group consisting of the media element and the WebRTC client;
receive a WebRTC video response token; and
establish a WebRTC interactive video session between the WebRTC' client and the media element based on the WebRTC video initiation token and the WebRTC video response token; and
establish the WebRTC interactive session between the remote endpoint and the SIP endpoint based on the SIP endpoint WebRTC token by:
establishing a first WebRTC audio stream between the SIP endpoint and the media element; and
establishing a WebRTC video stream and a second WebRTC audio stream between the remote endpoint and the media element.

19. The non-transitory computer-readable medium of claim 15 having stored thereon the computer-executable instructions to cause the processor to:
intercept the WebRTC initiation token by intercepting the WebRTC initiation token generated by the remote endpoint; and
generate the SIP endpoint WebRTC token based on the WebRTC initiation token by:
sending the WebRTC initiation token to a media element;
receiving the SIP endpoint WebRTC token from the media element;
requesting a media element SIP offer from a first one selected from the group consisting of the media element and the SIP endpoint;
receiving the media element SIP offer;
generating a SIP initiation request based on the media element SIP offer;
sending the SIP initiation request to a second one selected from the group consisting of the media element and the SIP endpoint;
receiving a SIP answer message; and
sending the SIP answer message to the first of the media element and the SIP endpoint.

20. The non-transitory computer-readable medium of claim 19 having stored thereon the computer-executable instructions to cause the processor to:
after generating the SIP endpoint WebRTC token based on the WebRTC initiation token:

sending a WebRTC video initiation token received from a first one selected from the group consisting of the media element and the WebRTC client to a second one selected from the group consisting of the media element and the WebRTC client;

receiving a WebRTC video response token; and establishing a WebRTC interactive video session between the WebRTC client and the media element based on the WebRTC video initiation token and the WebRTC video response token; and establish the WebRTC interactive session between the remote endpoint and the SIP endpoint based on the SIP endpoint WebRTC token by:

establishing a first WebRTC audio stream between the SIP endpoint and the media element; and establishing a WebRTC video stream and a second WebRTC audio stream between the remote endpoint and the media element.

* * * * *